US007152814B1

(12) United States Patent
Schapper et al.

(10) Patent No.: US 7,152,814 B1
(45) Date of Patent: Dec. 26, 2006

(54) ADJUSTABLE SPRAY PATTERN SPRINKLER

(75) Inventors: Aaron Schapper, Park City, UT (US); Christian M. Olsen, Bountiful, UT (US); Chadwick L. Wilson, Woods Cross, UT (US)

(73) Assignee: Orbit Irrigation Products, Inc., Bountiful, UT (US)

( * ) Notice: Subject to any disclaimer, the term of this patent is extended or adjusted under 35 U.S.C. 154(b) by 187 days.

(21) Appl. No.: 10/770,227

(22) Filed: Feb. 2, 2004

(51) Int. Cl.
*B05B 1/26* (2006.01)
*B05B 15/10* (2006.01)
*B05B 17/04* (2006.01)
*A01G 27/00* (2006.01)

(52) U.S. Cl. ...................... 239/520; 239/204; 239/518; 239/70; 239/11; 239/DIG. 1

(58) Field of Classification Search ................ 239/520, 239/204, 518, 70, 11, DIG. 1, 201, 222.11, 239/391, 394, 500, 501, 524, 562, 580, DIG. 15
See application file for complete search history.

(56) References Cited

U.S. PATENT DOCUMENTS

| | | | | |
|---|---|---|---|---|
| 682,590 | A | 9/1901 | Greer | |
| 4,119,275 | A * | 10/1978 | Hunter | 239/456 |
| 4,189,099 | A * | 2/1980 | Bruninga | 239/200 |
| 4,579,285 | A | 4/1986 | Hunter | |
| 4,815,662 | A | 3/1989 | Hunter | |
| 4,842,201 | A | 6/1989 | Hunter | |
| 4,867,379 | A | 9/1989 | Hunter | |
| 4,898,332 | A | 2/1990 | Hunter et al. | |
| 4,932,590 | A | 6/1990 | Hunter | |
| 4,967,961 | A | 11/1990 | Hunter | |
| 4,971,250 | A | 11/1990 | Hunter | |
| 5,022,585 | A * | 6/1991 | Burgess | 239/70 |
| 5,050,800 | A * | 9/1991 | Lamar | 239/201 |
| 5,058,806 | A | 10/1991 | Rupar | |
| 5,148,990 | A | 9/1992 | Kah, Jr. | |
| 5,205,491 | A | 4/1993 | Hadar | |
| 5,556,036 | A | 9/1996 | Chase | |
| 5,749,518 | A * | 5/1998 | Wang | 239/17 |
| 5,845,849 | A * | 12/1998 | Mitzlaff | 239/203 |
| 6,019,295 | A | 2/2000 | McKenzie | |
| 6,145,758 | A | 11/2000 | Ogi et al. | |
| 6,223,999 | B1 | 5/2001 | Lemelshtrich et al. | |
| 6,820,825 | B1 * | 11/2004 | Wang | 239/457 |
| 2002/0130202 | A1 | 9/2002 | Kah, Jr. et al. | |

* cited by examiner

*Primary Examiner*—Kevin Shaver
*Assistant Examiner*—Darren Gorman
(74) *Attorney, Agent, or Firm*—Madson & Austin

(57) ABSTRACT

A sprinkler has a housing with an inlet portion and an outlet portion in which a first outlet aperture is formed. The first outlet aperture may cooperate with other outlet apertures to define a spiral shape. A cam is disposed upstream of the first outlet aperture. The cam is rotatable about a cam axis to cover varying portions of the outlet apertures. After moving through the outlet apertures, water strikes a deflector and is sprayed outward from the head. The orientation of the cam establishes an arc angle through which water is sprayed, including a full-circle spray pattern. The deflector may be stationary or rotatable. In one alternative configuration, the outlet apertures and each leads to a different strip nozzle. The cam has an open portion that can be rotated into alignment with each of the outlet apertures to determine which of the strip nozzles are active.

64 Claims, 8 Drawing Sheets

12
14
16
22
118
126
128
130
162
298
306
308
316
324
332
334
336
360
364
366
392
394
395
396

ADJUSTABLE SPRAY PATTERN SPRINKLER

BACKGROUND OF THE INVENTION

1. Field of the Invention

The present invention relates to systems and methods for irrigating soil. More specifically, the present invention relates to a sprinkler head and related methods that distribute water over a variable spray pattern.

2. Description of Related Art

Irrigation not only permits foodstuffs to be grown, but also enables the cultivation of attractive plant life that otherwise would not have sufficient water to thrive. Many households now utilize sprinkler systems to provide irrigation in a comparatively uniform and trouble-free manner.

Often, a control unit such as a timer is used to regularly initiate operation of the sprinkler system to automatically provide the desired distribution of irrigation water. The timer is electrically connected to a plurality of electrically operated valves, each of which is able to permit water to flow into a corresponding zone of the sprinkler system. Each zone may have a number of sprinklers, each of which is designed to distribute water in a predetermined pattern.

Sprinklers are available in a wide variety of different configurations, depending on the shape of the area to be irrigated. Some sprinklers spray water in a circular or part-circular pattern. For example, some sprinklers are designed to provide a quarter-circle pattern, while others spray water in half circle, three-quarters circle, or full-circle patterns. Additionally, some sprinklers are designed to irrigate a strip between a sidewalk and a street. Such sprinklers typically distribute water within a generally rectangular area. Strip sprinklers include multiple types, including center strip sprinklers, side strip sprinklers, and end strip sprinklers, depending on where the sprinkler is to be positioned within the strip.

A typical irrigation system includes a variety of sprinkler types, including several of the above. Consequently, the installer must have a relatively wide inventory of sprinklers available. The installer must carefully lay out the irrigation system prior to purchasing the components to obtain the correct quantity of each sprinkler type. A change in irrigation plans may necessitate additional trips to the store to purchase and/or exchange sprinklers. Some areas, such as those with corners between 90°, 180°, 270°, and 360°, are difficult or impossible to adequately or efficiently irrigate with the limited number of spray angles available. Furthermore, if the irrigation needs within a certain area change over time, one or more sprinklers may need to be replaced with different types.

In order to alleviate some of the foregoing problems, variable arc sprinklers have been developed. Many known variable arc sprinklers have two helical edges that define a slot. The angular width of the slot can be varied by rotating one helical edge with respect to the other to vary the magnitude of the angle within which water is sprayed from the sprinkler.

Unfortunately, known variable arc sprinklers have a number of inherent limitations. For example, many such sprinklers require axial (i.e., vertical) motion of the top end of the sprinkler to provide adjustment. Hence, even if the sprinkler is initially installed at the proper height, subsequent adjustment of the sprinkler may remove the top of the sprinkler from its initial position. Thus, the sprinkler may not have sufficient spray clearance, or may be damaged by lawn care equipment.

Furthermore, many known variable arc sprinklers are unable to provide an even distribution of water across the selected angle. Thus, the corresponding soil is unevenly irrigated. Many known variable arc sprinklers are unable to effectively provide full-circle coverage because the flow of water from the sprinkler head is discontinuous over the adjacent ends of the arc. Hence, even at a "full-circle" setting, there may be 5% or more along which water is not sprayed from the head, or is sprayed at such a low volume that corresponding region is not sufficiently irrigated.

Yet further, many known variable arc sprinklers are relatively complex, and are therefore far more expensive than their fixed-angle counterparts. Some known variable arc sprinklers have parts with relatively complex geometries that cannot be readily produced through the use of economical methods. Some adjustable sprinklers also have visible parts that are asymmetrical, and therefore may not look attractive to a user.

Still further, known variable arc sprinklers are generally not suitable for strip irrigation because they broadcast water over a pie-shaped or circular area that does not suit the dimensions of typical strips. Accordingly, the problems described above have not been fully remedied by existing sprinkler designs.

SUMMARY OF THE INVENTION

The apparatus of the present invention has been developed in response to the present state of the art, and in particular, in response to the problems and needs in the art that have not yet been fully solved by currently available irrigation systems and components. Thus, it is an overall objective of the present invention to provide irrigation systems and sprinklers that remedy the shortcomings of the prior art.

To achieve the foregoing objective, and in accordance with the invention as embodied and broadly described herein in the preferred embodiment, an irrigation system is used to irrigate an area. The irrigation system has a valving system designed to control flows of an irrigation liquid, such as water, to a plurality of water distribution units such as sprinklers. The sprinklers receive water from a plurality of distribution conduits, each of which is in communication with a valve assembly. Each valve assembly has a fluid transfer portion and an actuator portion designed to actuate elements within the valve housing to move the valve assembly between an open configuration and a closed configuration.

Each valve assembly also has a pair of wires that conveys a valve activation signal to the actuator to move the valve assembly between the open and closed configurations. The valve assemblies may be connected to a feeder conduit to form a manifold that receives water from a main line. The manifold may be disposed underground, within a manifold box covered by a lid. Alternatively, the manifold may be attached to an above-ground spigot for use in a hose bib irrigation system. Control unit wires extend from the valve wires to a control unit, such as a timer.

At least one of the sprinklers may be a pop-up type sprinkler, and may thus have a casing and a pop-up stem designed to slide upward from the casing during operation of the sprinkler. The pop-up stem supports a spray head from which the water is ejected. The spray head is designed to spray water through a variable arc selectable by a user.

The spray head may have an adjustment dial, a shaft, a deflector, a housing, a cam, and an adjustment screw. A filter is inserted into the pop-up stem to rest underneath the spray head. The housing has an inlet portion adjacent to the end of the pop-up stem and an outlet portion disposed above (i.e., downstream of) the inlet portion. The housing has an outer wall with a generally tubular shape through which water flows. The housing is centered about a cam axis. Threads are formed on the inside surface of the outer wall to permit threaded engagement of the inlet portion with the pop-up stem. The outer wall has a plurality of indentations disposed on the outer surface of the inlet portion to facilitate rotation of the housing by hand so that the spray head can easily be manually attached to or removed from the pop-up stem.

The outlet portion has a plate that crosses the interior of the housing. A central hole and a receiving hole are formed in the plate. The plate has a plurality of outlet apertures, each of which extends through an angle and has a gradually increasing radius within the angle, with respect to the cam axis. The outlet apertures are arranged end-to-end to form a spiral shape extending full-circle.

The deflector is attached to the housing and is disposed directly above the housing to distribute water exiting the outlet apertures. The deflector has a lip that extends outward from the cam axis, and is radially coextensive with the outer wall of the housing. The deflector also has a central hole extending along the cam axis and a conical portion that extends from the lip toward the housing. A skirt extends from the conical portion toward the housing. The skirt has a spiral shape similar to that of the combined outlet apertures. The skirt is sized such that its spiral shape is aligned with the interior edges of the outlet apertures. A hub and an orientation post extend downward from the skirt to seat in the central hole and the receiving hole, respectively.

The cam has an outer edge that also has a spiral shape. The outer edge is also sized to align with the interior edges of the outlet apertures, or is sized only slightly larger than the shape defined by the interior surfaces. The cam also has a central hole coaxial with the cam axis. The adjustment dial has an outer edge that is textured to facilitate gripping by hand and a central hole coaxial with the cam axis. The shaft has a first end, a second end, and a bore with a threaded interior surface. The adjustment screw has a head coupled to a shaft on which corresponding threads are disposed. The shaft terminates in a slot.

The adjustment dial, shaft, deflector, housing, cam, and adjustment screw may be easily manufactured through the use of known methods. According to one example, the housing and the deflector may be made of plastic via injection molding. The shaft may be cut from a stock length of interior threaded, tubular metal or plastic. The adjustment dial and the cam may be stamped from metal or plastic sheets. The adjustment screw may be formed via casting or other known methods.

The adjustment dial, shaft, deflector, housing, cam, and adjustment screw are assembled as follows. The housing is disposed such that the hub and the orientation post are aligned with the central hole and the receiving hole, respectively, of the plate. The housing and the deflector are then moved together so that the hub is inserted into the central hole and the orientation post is inserted into the receiving hole. The housing and the deflector may or may not be attached together. The engagement of the orientation post with the receiving hole keeps the deflector from rotating with respect to the housing.

The first end of the shaft is then pressed into the central hole of the adjustment dial and the shaft is inserted through the central holes of the deflector and the housing so that the adjustment dial is disposed adjacent to the deflector. The cam is pressed onto the exposed second end of the shaft in such a manner that the second end is inserted into the central hole of the cam. The adjustment screw is then rotated into engagement with the threads of the bore of the shaft in such a manner that the slot is exposed proximate the first end of the shaft and the head extends from the second end. The filter is inserted into the pop-up stem, which has already been assembled with the casing, and the housing is threaded into engagement with the pop-up stem to complete assembly of the sprinkler.

In operation, water moves upward through the pop-up stem and flows through the filter. The water flows through the annular gap between the head of the adjustment screw and a tapered bore of the filter. The position of the head with respect to the tapered bore determines the flow rate of water through the sprinkler. After leaving the filter, the water flows into the inlet portion of the housing and against the cam. The water then flows through the portion of the outlet apertures that is not covered by the cam. After leaving the outlet apertures, the water flows against the conical portion of the deflector and is deflected away from the cam axis to spray outward from the spray head.

The adjustment dial may be rotated to rotate the shaft, thereby rotating the cam. The relative sizes of the cam and the outlet apertures enable the orientation of the cam to determine the angle through which water flows through the outlet apertures. The adjustment dial may be rotated to permit water to flow from the spray head through an arc angle ranging from about 20° to about 360° (full-circle). The adjustment screw may be rotated to move the head of the adjustment screw closer to or further from the tapered bore, thereby controlling the quantity of water distributed by the spray head.

According to one alternative embodiment of the invention, the adjustment dial, shaft, cam, and adjustment screw are substantially as described above. As above, the housing also has outlet apertures disposed in a spiral shape. However, the deflector and housing are designed such that the deflector is able to rotate with respect to the housing. The deflector has a lip from which a conical portion extends toward the housing. The conical portion is truncated, and a plurality of vanes is formed on the resulting surface. The plate of the housing has no receiving hole, and the deflector has no orientation post; accordingly, relative rotation between the housing and the deflector is permitted.

The vanes are curved in such a manner that water flowing from the outlet apertures impinges against the vanes and causes the deflector to rotate. The water moves through the grooves between the vanes and exits the grooves with tangential, as well as radial, velocity. The rotation of the deflector may provide more even water distribution and attractive operation.

According to another alternative embodiment of the invention, a spray head may be designed to provide variable strip irrigation. Such a spray head may have an adjustment dial, a shaft, and an adjustment screw similar to those of the previous embodiments. A housing, a deflector, and a cam are also provided. Like those of the previous embodiments, the housing has an inlet portion and an outlet portion that includes a plate in which a plurality of outlet apertures are formed. However, the outlet apertures do not form a spiral; rather, the outlet apertures are circular or elongated along a straight path.

Like the deflector of the first embodiment, the deflector includes a lip from which a conical portion extends toward the housing. A hub and an orientation post extend from the conical portion toward the housing. The plate of the housing has a central hole and a receiving hole that receive the hub and the orientation post in a manner that prevents relative rotation between the deflector and the housing.

A plurality of water distribution features, such as specially shaped grooves, is formed in the conical portion. Each of the water distribution features is aligned with one of the outlet apertures to distribute water from the corresponding outlet aperture. The water distribution features include multiple configurations that are designed to provide a plurality of different spray patterns such as center strip irrigation, side strip irrigation, and end strip irrigation.

The cam also is not spiral-shaped, but has a generally circular outer edge with a notch extending inward. The cam has a central hole and a hole disposed on the opposite side of the central hole from the notch. The cam is coupled to the adjustment dial in a manner similar to those of the previous embodiments. Rotation of the adjustment dial rotates the cam to determine which of the outlet apertures will be uncovered by the cam to permit water to flow to the corresponding water distribution feature.

The hole and the notch cooperate such that, in one orientation of the cam, water is able to flow simultaneously through two of the outlet apertures to reach two of the water distribution features, thereby providing center strip irrigation. In another orientation, flow may be permitted only to one of the water distribution features used for center strip irrigation to provide end strip irrigation. In another orientation, flow may be permitted to a different water distribution feature to provide side strip irrigation.

Through the use of the apparatus and method of the invention, a sprinkler may provide relatively uniform water distribution over a continuously variable angle including a full-circle spray pattern. A sprinkler may alternatively be adjustable between different strip irrigation settings including center strip irrigation, side strip irrigation, and end strip irrigation. Furthermore, such sprinklers may be easy to use and may be produced at relatively low cost. These and other features and advantages of the present invention will become more fully apparent from the following description and appended claims, or may be learned by the practice of the invention as set forth hereinafter.

BRIEF DESCRIPTION OF THE DRAWINGS

A particular description of the invention will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 7F, is not intended to limit the scope of the invention, as claimed, but is merely representative of presently preferred embodiments of the invention.

For this application, the phrases “connected to,” “coupled to,” and “in communication with” refer to any form of interaction between two or more entities, including mechanical, electrical, magnetic, electromagnetic, and thermal interaction. The phrase “attached to” refers to a form of mechanical coupling that restricts relative translation or rotation between the attached objects. The phrases “pivotally attached to” and “slidably attached to” refer to forms of mechanical coupling that permit relative rotation or relative translation, respectively, while restricting other relative motion.

The phrase “attached directly to” refers to a form of attachment by which the attached items are either in direct contact, or are only separated by a single fastener, adhesive, or other attachment mechanism. The term “abutting” refers to items that are in direct physical contact with each other, although the items may not be attached together. The terms “integrally formed” refer to a body that is manufactured integrally, i.e., as a single piece, without requiring the assembly of multiple pieces. Multiple parts may be integrally formed with each other if they are formed from a single workpiece.

Figure 1:
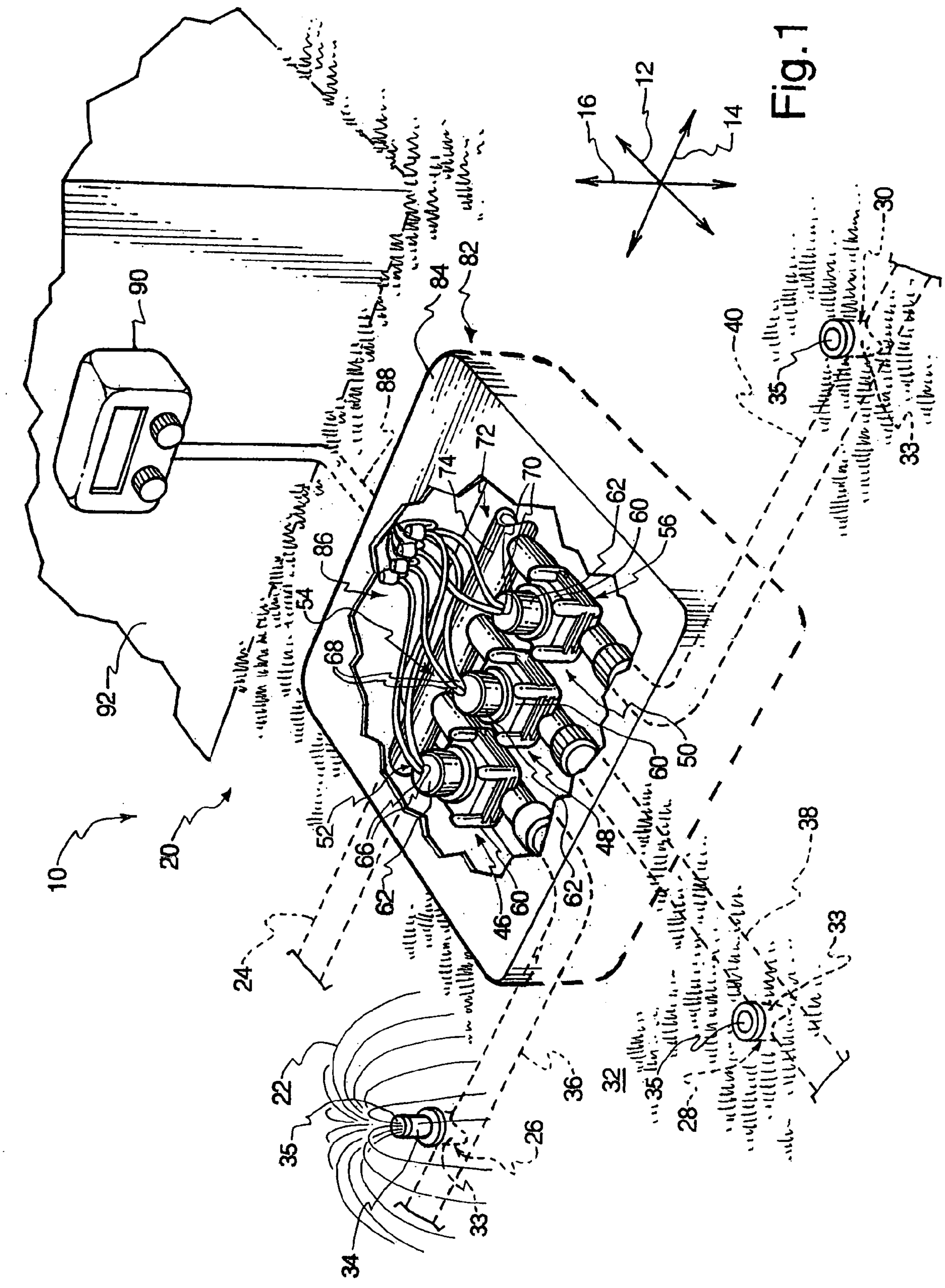
FIG. 1 is a perspective view of an irrigation system according to one embodiment of the invention.

Referring to FIG. 1, a perspective view depicts an irrigation system 10 according to one embodiment of the invention. The irrigation system 10 has a longitudinal direction 12, a lateral direction 14, and a transverse direction 16. The irrigation system 10 incorporates a valving system 20, which will be described in greater detail subsequently.

The irrigation system 10 is designed to receive water 22 via a main line 24. In this application, "water" includes not only pure water, but also water with additives such as fertilizers, pesticides, or the like. The water 22 is distributed by a plurality of water distribution units over a patch of land designated for plant growth.

"Water distribution unit" encompasses a variety of devices used to spread water, such as pop-up sprinkler heads, rotary sprinklers, bubblers, drip irrigation systems, and the like. The irrigation system 10 includes water distribution units in the form of a first sprinkler 26, a second sprinkler 28, and a third sprinkler 30. The sprinklers 26, 28, 30 are arrayed to irrigate an area 32. Of course, an irrigation system 10 may have more or less than three sprinklers. In FIG. 1, each of the sprinklers 26, 28, 30 is a pop-up sprinkler that includes a casing 33, a pop-up stem 34 designed to extend upward from within the casing 32 in response to water pressure, and a spray head 35 disposed on the top end of the corresponding pop-up stem 34 to distribute the water 22.

The first, second and third sprinklers 26, 28, 30 are supplied with water by first, second and third distribution conduits 36, 38, 40, respectively. Each of the distribution conduits 36, 38, 40 may extend further to supply additional water distribution units (not shown). In this application, a "conduit" is any structure capable of conducting a fluid under pressure from one location to another.

Water flow to the first, second, and third distribution conduits 36, 38, 40 is controlled by a first valve assembly 46, a second valve assembly 48, and a third valve assembly 50, respectively. The valve assemblies 46, 48, 50 may optionally operate to permit water flow to only one of the conduits 36, 38, 40 at any given time, so that each conduit 36, 38, 40, in turn, receives the full pressure and flow rate of water from the main line 24. The first, second, and third valve assemblies 46, 48, 50 have a first valve 52, a second valve 54, and a third valve 56, respectively.

As depicted in FIG. 1, the first valve assembly 46 is in the open configuration to supply water to the first sprinkler 26 via the first conduit 36. Hence, the pop-up stem 34 of the first valve assembly 46 is extended upward from the corresponding casing 33, and the spray head 35 of the first sprinkler 26 is exposed to permit water flow from the spray head 35. The second and third valve assemblies 48, 50 are in the closed configuration so that no significant amount of water flows into the second and third conduits 38, 40, and the second and third sprinklers 28, 30 are inactive. The pop-up stems 34 and spray heads 35 of the second and third sprinklers 28, 30 are retracted into the corresponding casings 32.

Each of the valves 52, 54, 56 has a fluid transfer portion 60 in fluid communication with the associated distribution conduit 36, 38, or 40. The fluid transfer portion 60 contains one or more elements that block or unblock water flow through the fluid transfer portion 60. Thus, each of the valves 52, 54, 56 has a closed configuration, in which water flow is blocked, and an open configuration, in which water flow is comparatively freely permitted.

Each of the valve assemblies 46, 48, 50 also has an actuator portion 62 attached to the fluid transfer portion 60. The actuator portion 62 moves the interior elements of the fluid transfer portion 60 to move the valve assembly 46, 48, 50 between the open and closed configurations. The actuator portion 62 may include an electrically operated device such as a linear or rotary solenoid, piezoelectric actuator, or electric motor. The valve assemblies 46, 48, 50 also include first valve wires 66, second valve wires 68, and third valve wires 70, respectively. Each set of valve wires 66, 68, 70 is coupled to the actuator portion 62 of the corresponding valve 52, 54, 56.

In this application, the term "valve" generally refers to the combination of the fluid transfer portion 60 and the actuator portion 62. The term "valve" is not limited to the embodiment shown, but may include a wide variety of actuator and fluid transfer portion combinations.

The valve assemblies 46, 48, 50 are interconnected to form a manifold 72, to which the main line 24 and the distribution conduits 36, 38, 40 are attached. More precisely, the manifold 72 includes a feeder conduit 74 that receives water from the main line 24 at one end. The valve assemblies 46, 48, 50 are arranged generally perpendicular to the feeder conduit 74 to receive the water. The manifold 72 is disposed within a manifold box 82, which may be disposed generally underground, as depicted. The manifold box 82 has a lid 84 designed to provide access to the manifold 72 for repairs or maintenance.

A plurality of control unit wires 86 are connected to valve wires 66, 68, 70. Except at the ends, the control unit wires 86 are covered by a sheath 88 designed to gather and protect the control wires 86. The control unit wires 86 extend from the valve wires 66, 68, 70 to a control unit designed to transmit valve activation signals through the control wires 86. As depicted, the valve wires 66, 68, 70 are connected to the control unit wires 86 via conventional wire nuts. If desired, the control wires 86 may alternatively be coupled to the valve wires 66, 68, 70 via some type of electrical junction unit.

The control unit may take the form of a timer 90, as illustrated in FIG. 1. The timer 90 transmits the valve activation signals via the control unit wires 86 according to a schedule established by a user. The phrase "control unit" is not limited to a timer, but may include any other device that transmits a valve activation signal. Such devices include simple switches, remote receivers, control system processors designed to measure variables and control operation of the irrigation system 10 based on those variables, and the like. The timer 90 may be attached to a wall 92 near the manifold box 82, as shown, or may be disposed at a remote location.

The configuration of FIG. 1 is not the only application in which valves according to the invention may be used. Valves such as the valves 52, 54, 56 may be used in other types of irrigation systems. For example, the valves 52, 54, 56 may be incorporated into a hose bib system. Thus, the valves 52, 54, 56 may be attached to a common above-ground garden spigot, either individually or as part of a differently configured manifold. The distribution conduits 36, 38, 40 may be effectively replaced with hoses or other above-ground irrigation water lines. One or more timers may be incorporated into the housings of the valves 52, 54, 56 to provide a simple and compact irrigation control system.

Figure 2:
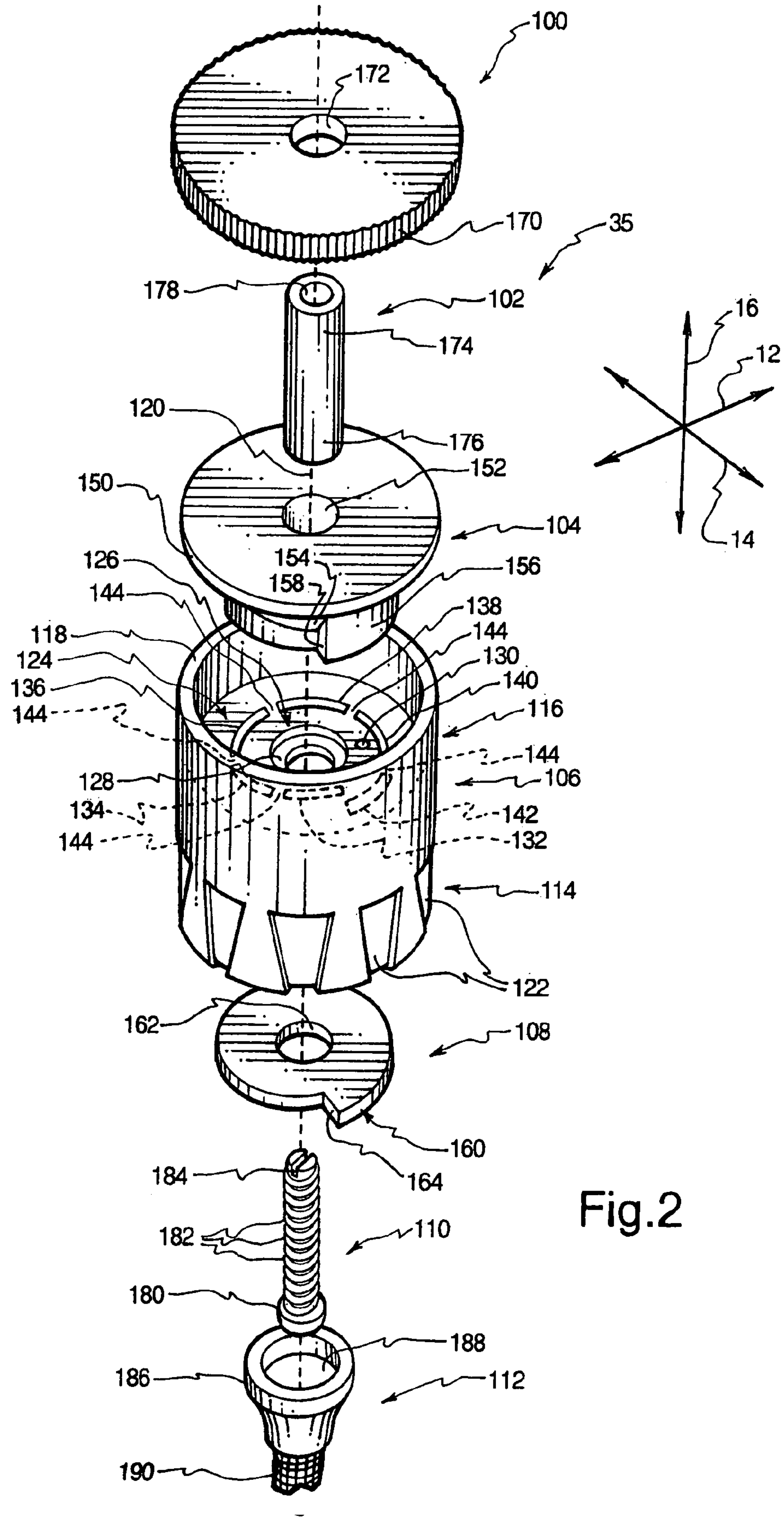
FIG. 2 is an exploded, perspective view of a spray head of one of the sprinklers of the irrigation system of FIG. 1.

Referring to FIG. 2, an exploded, perspective view illustrates the spray head 35 of one of the sprinklers 26, 28, 30 of FIG. 1 in greater detail. As shown, the spray head 35 includes an adjustment dial 100, a shaft 102, a deflector 104, a housing 106, a cam 108 and an adjustment screw 110. The adjustment dial 100, shaft 102, deflector 104, housing 106, cam 108, and adjustment screw 110 are assembled together to form the spray head 35, which threadably engages the top portion of the corresponding pop-up stem 34. A filter 112 is inserted into the pop-up stem 34 below the spray head 35 to filter water entering the spray head 35 and to provide flow rate adjustment in a manner that will be described subsequently.

As shown, the housing 106 has an inlet portion 114 and an outlet portion 116. The housing 106 has an outer wall 118 with a generally tubular shape concentric with a cam axis 120. The outer wall 118 has female threads disposed on an interior surface (not shown) of the inlet portion 114. The outer wall 118 also has indentations 122 distributed about its outer surface, within the inlet portion 114 to facilitate rotation of the housing 106 by hand. More precisely, a user may grip the outer wall 118 with a thumb and forefinger and rotate the housing 106 via the indentations 122 with the thumb and forefinger to rotate the spray head 35 into engagement with the pop-up stem 34.

The outlet portion 116 of the housing 106 has a plate 124 with a substantially flat configuration that extends across the open interior of the outer wall 118, substantially perpendicular to the cam axis 120. In this application, "substantially flat" refers to an element with a face extending substantially along a plane. A "plate" is a substantially flat element with a comparatively small thickness perpendicular to the face. A central hole 126 is formed in the plate 124. The central hole 126 has a lip 128 that steps inward so that the central hole 126 has two distinct diameters. The plate 124 also has a receiving hole 130 that does not extend entirely through the plate 124.

Additionally, the plate 124 has a plurality of outlet apertures, including a first outlet aperture 132, a second outlet aperture 134, a third outlet aperture 136, a fourth outlet aperture 138, a fifth outlet aperture 140, and an sixth outlet aperture 142. As shown, each of the outlet apertures 132, 134, 136, 138, 140, 142 is elongated along a curved path with a radius that gradually increases within an angle, with respect to the cam axis 120.

More precisely, as each of the outlet apertures 132, 134, 136, 138, 140, 142 extends clockwise (as viewed from above), with respect to the cam axis 120, the radius of each outlet aperture 132, 134, 136, 138, 140, 142 increases with respect to the cam axis 120. The outlet apertures 132, 134, 136, 138, 140, 142 are disposed end-to-end so that, collectively, the outlet apertures 132, 134, 136, 138, 140, 142 follow a path that extends full-circle (i.e., about a substantially circular pattern) about the cam axis 120, with a radius that gradually increases throughout the 360° angle of rotation of the path.

The outlet apertures 132, 134, 136, 138, 140, 142 are separated from each other by bridges 144. In alternative embodiments, the bridges 144 may be omitted to provide one single outlet aperture that provides the entire range of adjustability for a spray head. In the embodiment of FIG. 2, the bridges 144 are included as an optional feature to avoid undesired flexure of the portion of the plate 124 that lies within the outlet apertures 132, 134, 136, 138, 140, 142. Such flexure may alter the width of the corresponding outlet aperture(s), thereby adversely affecting the consistency of water distribution from the spray head.

In the embodiment of FIG. 2, the housing 106 is integrally formed. In alternative embodiments, the housing 106 may include multiple parts. For example, the inlet and outlet portions 114, 116 may be separately formed, or the outer wall 118 may be formed separately from the plate 124.

The deflector 104 has a lip 150 that has a diameter approximately equal to the outer diameter of the outer wall 118 of the housing 106. A central hole 152 is formed in the deflector 104, concentric with the cam axis 120. The deflector 104 also has a conical portion 154 that extends from the lip 150 toward the housing 106. The conical portion 154 is centered on the cam axis 120 and is angled such that water impinging against the conical portion 154 from the housing 106 will generally be directed outward and upward from the cam axis 120. In this application, a "generally conical shape" may include protrusions, curves, or other departures from the conical shape. Also, a truncated cone or frusto-conical shape has a "generally conical shape."

The deflector 104 also has a skirt 156 extending from the conical portion 154 toward the housing 106. The skirt 156 has a gradually increasing radius within the same angle through which the outlet apertures 132, 134, 136, 138, 140, 142 collectively extend (e.g., full-circle in the embodiment of FIG. 2). The skirt 156 is sized to line up with the interior edges of the outlet apertures 132, 134, 136, 138, 140, 142. Thus, water exiting the outlet apertures 132, 134, 136, 138, 140, 142 is blocked from moving toward the cam axis 120 by the skirt 156, but the skirt 156 does not significantly block water flow out of the outlet apertures 132, 134, 136, 138, 140, 142. The skirt 156 has a flat edge 158 aligned with the space between the first and sixth outlet apertures 132, 142.

The deflector 104 also has a hub (not visible) and an orientation post (not visible) that extend toward the housing 106 from the skirt 156. The hub and the orientation post are inserted into the central hole 126 and the receiving hole 130, respectively, of the plate 124. The engagement of the hub and the central hole 126 and the engagement of the orientation post and the receiving hole 130 keep the deflector 104 from rotating with respect to the housing 106. Thus, during operation of the spray head 35, the skirt 156 is always properly oriented with respect to the outlet apertures 132, 134, 136, 138, 140, 142.

The cam 108 has an outer edge 160. Like the skirt 156, the outer edge 160 has a gradually increasing radius within the same angle through which the outlet apertures 132, 134, 136, 138, 140, 142 collectively extend (e.g., full-circle in the embodiment of FIG. 2). The outer edge 160 may also be aligned with the interior edges of the outlet apertures 132, 134, 136, 138, 140, 142, or may extend only just past the interior edges of the outlet apertures 132, 134, 136, 138, 140, 142. Thus, the cam 108 may be rotated to a variety of orientations with respect to the outlet apertures 132, 134, 136, 138, 140, 142 to uncover a variable angular portion of the combined outlet apertures 132, 134, 136, 138, 140, 142. The size of the angle that is uncovered determines the size of the angle through which water is sprayed from the spray head 35, as will be explained in greater detail subsequently.

The cam 108 also has a central hole 162 coaxial with the cam axis 120. The outer edge 160 has a flat edge 164 aligned with the space between the first and sixth outlet apertures 132, 142. The cam 108 may be constructed of a metal or any other suitable rigid material. Rust resistant metals such as stainless steel, aluminum, copper, brass and the like may be used to reduce the likelihood of corrosion.

In alternative embodiments, a cam (not shown) may be uniformly thicker, or may have a domed or conical shape that is thicker about the corresponding central hole to facilitate press fitting with the shaft 102. In other alternative embodiments, a cam may have a generally ring-shaped configuration with a spiral-shaped inside edge. In yet other alternative embodiments, a cam may have a hole pattern that provides variable flow through the outlet apertures 132, 134, 136, 138, 140, 142, in place of a spiral-shaped edge.

The adjustment dial 100 may similarly be formed of a rust resistant metal such as stainless steel, aluminum, copper, or brass or any other suitable material. The adjustment dial 100 has an outer edge 170 that extends along a circle. As shown, the outer edge 170 may be knurled or otherwise textured to facilitate rotation of the adjustment dial 100 by hand. The adjustment dial 100 also has a central hole 172 that is coaxial with the cam axis 120.

The adjustment dial 100 may have a diameter slightly larger than that of the remainder of the spray head 35. Accordingly, when the pop-up stem 34 retracts into the casing 33 after completion of watering, the remaining components of the spray head 35 slide into the casing 33, and the edge of the adjustment dial 100 seats against the lip of the opening of the casing 33 from which the pop-up stem 34 emerges. Accordingly, the adjustment dial 100 may be gripped and rotated to adjust the spray pattern of the spray head 35 when the pop-up stem 34 is in the retracted position.

In this application, the word “dial” is to be interpreted broadly. For example, in alternative embodiments, an adjustment dial need not be circular in shape, but may have any shape that is easily rotated by a user, with or without tooling. It may even be beneficial to provide an adjustment dial that must be rotated through the use of tooling to help prevent tampering.

Like the cam 108 and the adjustment dial 100, the shaft 102 may be formed of a rust resistant metal such as stainless steel, aluminum, copper, or brass or any other suitable material. The shaft 108 serves to couple the adjustment dial 100 to the cam 108 in such a manner that rotation of the adjustment dial 100 causes the cam 108 to rotate. More precisely, the shaft 108 has a first end 174 that fits into the central hole 172 of the adjustment dial and a second end 176 that fits into the central hole 162 of the cam 108. The first and second ends 174, 176 may be sized and/or shaped in such a manner that a press fit exists between the first end 174 and the central hole 172 of the adjustment dial 100 and a press fit exists between the second end 176 and the central hole 162 of the cam 108.

The shaft 102 has a bore 178 that is threaded and sized to receive the adjustment screw 110 such that the adjustment screw 110 is able to rotate to move along the transverse direction 16, e.g., upward when the spray head 35 is oriented as in FIG. 1. The outside diameter of the shaft 102 is sized such that clearance exists between the shaft 102 and the central hole 152 of the deflector 104 and between the shaft 102 and the lip 128 of the central hole 126 of the plate 124. Thus, the shaft 102 is able to rotate with respect to the housing 106 and the deflector 104.

The adjustment screw 110 has a head 180 disposed adjacent to the filter 112. The head 180 has a domed shape designed to cooperate with the filter 112 to control the rate at which water enters the spray head 34. Additionally, the adjustment screw 110 has a plurality of threads 182 and a slot 184 disposed on the opposite side of the adjustment screw 110 from the head 180.

The filter 112 has a lip 186 sized to rest on a corresponding shelf (not shown) within the pop-up stem 34. The filter 112 also has a tapered bore 188 that extends inward from the lip 186. The tapered bore 188 has a funnel-like shape through which water flows to enter the spray head 35. The space between the tapered bore 188 and the head 180 of the adjustment screw 110 is the flow path through which water is able to enter the spray head 35. Moving the head 180 with respect to the tapered bore 188 controls the flow rate of water entering the spray head 35, as will be described subsequently. The filter 112 has a mesh 190 through which water must flow to reach the tapered bore 188. The mesh 190 keeps the spray head 35 unclogged by trapping solid matter to keep it from entering the spray head 35.

The adjustment dial 100, shaft 102, deflector 104, housing 106, cam 108, and adjustment screw 110 may be manufactured according to a number of methods. According to one method, the adjustment dial 100 and the cam 108 may be stamped from sheets of metal or any other suitable material. As mentioned above, rust-resistant metals such as aluminum, stainless steel, copper, and brass may be used. The shaft 102 may be cut from a length of stock tubular material, which may be formed via known methods. The threads may be present in the stock material, or may be formed via a tapping operation or the like. The adjustment screw may be die cast or otherwise formed of a rust-resistant material like those listed above. The deflector 104 and the housing 106 may each be formed of plastic via injection molding or other known methods.

The adjustment dial 100, shaft 102, deflector 104, housing 106, cam 108, and adjustment screw 110 may be assembled via a variety of methods. According to one method, the deflector 104 may first be aligned with the housing 106 so that the hub and the orientation post are coaxial with the central hole 126 and the receiving hole 130, respectively, of the plate 124. The deflector 104 and the housing 106 may then be moved toward each other so that the hub and the orientation post are inserted into the central hole 126 and the receiving hole 130, respectively. A press fit may be formed to keep the housing 106 and the deflector 104 together. Alternatively, methods such as RF welding, ultrasonic welding, adhesive bonding, or the like may be used to keep the deflector 104 and the housing 106 together.

The cam 108 may then be aligned with the shaft 102 and the cam 108 and shaft 102 may be moved together so that the second end 176 of the shaft 102 enters the central hole 162 of the cam 108. The second end 176 may be sized to form an interference fit within the central hole 162. Accordingly, some force may be required to insert the second end 176 into the central hole 162. The first end 174 of the shaft 102 may then be inserted through the central hole 126 of the plate 124 and then through the central hole 152 of the deflector 104 in such a manner that the cam 108 is disposed in the inlet portion 114 of the housing. The plate 124 and the deflector 104 are then disposed between the cam 108 and the first end 174, and the cam 108 is disposed upstream of the plate 124 to block water flow through the outlet apertures 132, 134, 136, 138, 140, 142.

The first end 174 of the shaft 102 is then aligned with and inserted into the central hole 172 of the adjustment dial 100 in a manner similar to that of the cam 108. Again, force may be applied to form an interference fit. The cam 108 and/or the adjustment dial 100 may be made somewhat thicker, if desired, to provide a greater transverse length of the central holes 162, 172 to provide a more secure press fit. Alternatively, the cam 108 and/or the adjustment dial 100 may be made thicker around the central holes 162, 172 and may step to a thinner configuration or may be domed or otherwise shaped in such a manner that the outer edges 160, 170 are relatively thinner in the transverse direction 16. If desired, other attachment methods such as welding, adhesive bonding, or the like may be applied in addition to or in the alternative to the press fits described above.

The adjustment screw 110 may then be inserted into engagement with the bore 178 of the shaft 102. More precisely, the slot 184 of the adjustment screw 110 is inserted into the bore 178 proximate the second end 176 of the shaft 102. The adjustment screw 110 is then rotated about the cam axis so that the slot 184 travels through the shaft 102 and emerges from the bore 178 at the first end 174.

The spray head 35 is then fully assembled and ready for installation on the pop-up stem 34. The filter 112 may first be inserted so that the lip 186 rests on a shelf of the pop-up stem 34. Then, the spray head 35 may be rotated in such a manner that the female threads within the inlet portion 114 of the housing 106 engage the male threads of the pop-up stem 34.

In operation, water flows through the pop-up stem 34 and through the mesh 190 of the filter 112 to reach the tapered bore 188. The water passes through the space between the tapered bore 188 and the head 180 of the adjustment screw 110 to reach the inlet portion 114 of the housing 106. The water then passes through the portion of the outlet apertures 132, 134, 136, 138, 140, 142 that is not blocked by the cam 108 and impinges against the conical portion 154 of the deflector 104. The water is deflected outward by the slope of the conical portion 154 so that the water is sprayed outward and upward from the spray head 35.

The flow rate of the water sprayed from the spray head 35 may be limited by the size of the gap between the head 180 of the adjustment screw 110 and the tapered bore 188. A screwdriver or other tool may be used to engage the slot 184 to rotate the adjustment screw 110, thereby moving the head 180 toward or away from the tapered bore 188. The head 180 may be moved to abut the tapered bore 188 to cut off water flow to the spray head 35. Alternatively, the head 180 may be moved far enough from the tapered bore 188 that the flow rate of water through the spray head 35 is limited primarily by the exposed flow area of the outlet apertures 132, 134, 136, 138, 140, 142.

As described previously, the relative orientations of the plate 124 and the cam 108 determine the angle through which water exits the spray head 35. A user may rotate the adjustment dial 100 by hand to rotate the cam 108 to the desired orientation with respect to the housing 106. The cam 108 rotates about the cam axis 120, but does not move along it. Accordingly, the cam 108 rotates "in-plane," or without moving from a stationary plane. The manner in which the cam 108 determines the spray pattern will be further illustrated and described in connection with FIGS. 3A, 3B, and 3C, as follows.

Figure 3A:
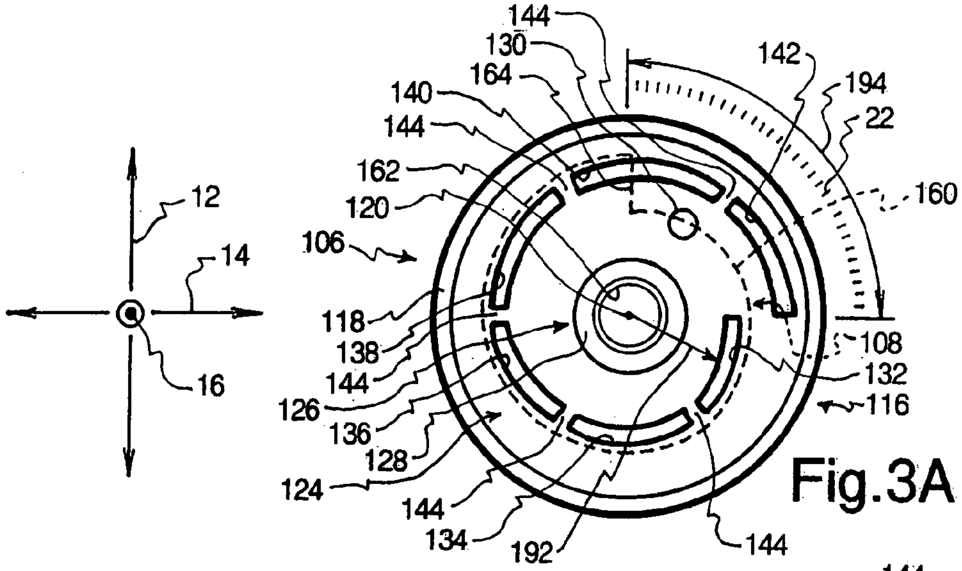
FIG. 3A is a plan view of the housing and the cam of the spray head of FIG. 2, with the housing and cam (shown in phantom lines) relatively positioned for 90° watering.

Referring to FIG. 3A, a plan view illustrates the housing 106 and the cam 108 in isolation. The housing 106 and the cam 108 (shown in phantom lines) are relatively positioned to provide quarter-circle (i.e., 90°) watering. As illustrated, the first outlet aperture 132 has a radius 192 with respect to the cam axis 120. The radius 192 gradually increases along the length of the first outlet aperture 132.

Each of the outlet apertures 132, 134, 136, 138, 140, 142 extends through an angle of approximately 60°. The outlet apertures 132, 134, 136, 138, 140, 142, collectively, extend substantially full-circle, or through an angle of 360°, within which the radius 192 of the outlet apertures 132, 134, 136, 138, 140, 142, collectively, increases gradually. Thus, as mentioned previously, the outlet apertures 132, 134, 136, 138, 140, 142 form a spiral shape with respect to the cam axis 120, which may accordingly be referred to as a "slot axis" of the outlet apertures 132, 134, 136, 138, 140, 142.

In alternative embodiments, the outlet aperture(s) need not extend full-circle, but may extend through an angle of less than 360°. The corresponding cam need not have a full-circle spiral shape, but may instead have an edge that is spiral shaped through an angle of the same magnitude as the angle through which the outlet aperture(s) extend. A "spiral" shape need not extend full-circle, but must simply have a gradually increasing radius through an angle.

As shown, the cam 108 is oriented such that the flat edge 164 of the cam 108 substantially bisects the fifth outlet aperture 140. Accordingly, the entire sixth outlet aperture 142 and half of the fifth outlet aperture 140 are uncovered by the cam 108 and available to conduct water 22 flow out of the housing 106. The first, second, third, and fourth outlet apertures 132, 134, 136, 138, and half of the fifth outlet aperture 140, are blocked by the cam 108. The resulting spray pattern is an angular portion of a circle, or an arc 194 of 90°.

Figure 3B:
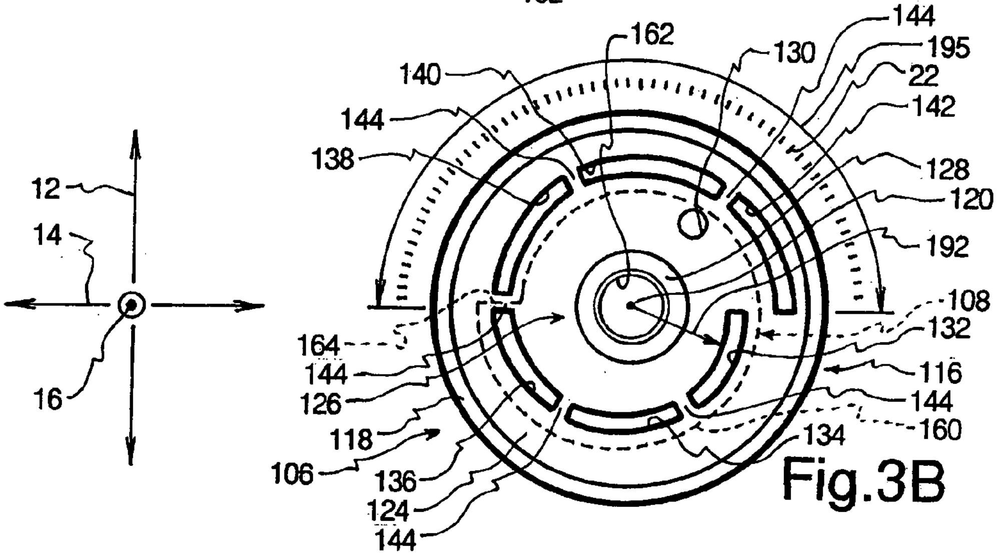
FIG. 3B is a plan view of the housing and the cam of the spray head of FIG. 2, with the housing and cam (shown in phantom lines) relatively positioned for 180° watering.

Referring to FIG. 3B, a plan view again illustrates the housing 106 and the cam 108 in isolation. In FIG. 3B, the cam 108 (shown in phantom lines) is oriented such that the flat edge 164 extends substantially between the third and fourth outlet apertures 136, 138. Consequently, the first, second and third outlet apertures 132, 134, 136 are blocked by the cam 108, and the fourth, fifth, and sixth outlet apertures 138, 140, 142 are unblocked to conduct water 22 out of the housing 106. The resulting spray pattern is half-circle, or an arc 195 of 180°.

Figure 3C:
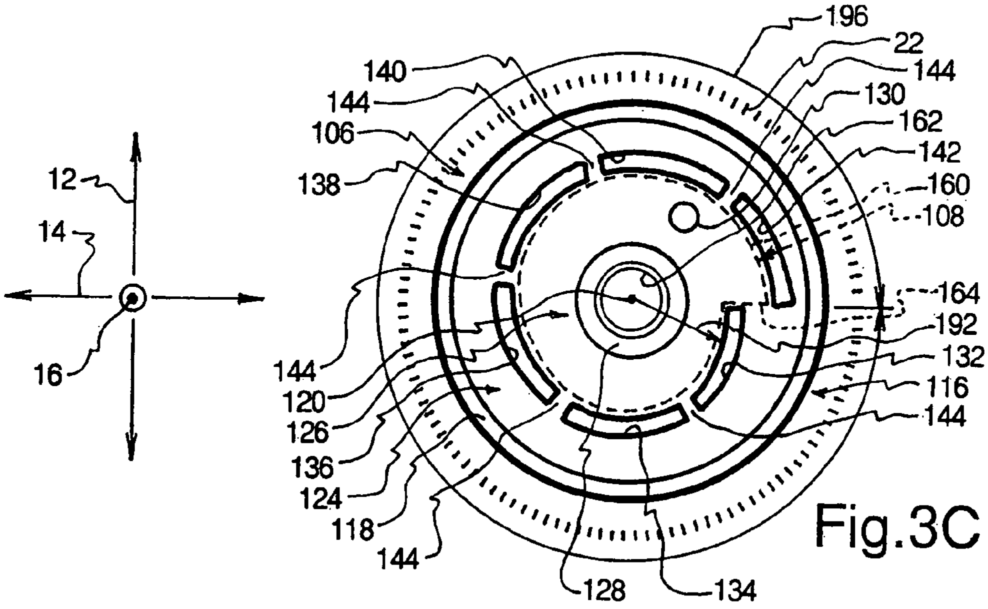
FIG. 3C is a plan view of the housing and the cam of the spray head of FIG. 2, with the housing and cam (shown in phantom lines) relatively positioned for full-circle watering.

Referring to FIG. 3C, a plan view again illustrates the housing 106 and the cam 108 in isolation. In FIG. 3C, the cam 108 (shown in phantom lines) is oriented such that the flat edge 164 extends substantially between the first and sixth outlet apertures 132, 142. Consequently, all of the outlet apertures 132, 134, 136, 138, 140, 142 are substantially unblocked to conduct water 22 out of the housing 106. The resulting spray pattern is full-circle, or an arc 196 of 360°.

Notably, the spray head 35 may have a minimum spray angle, such as about 20°. Accordingly, the spray head 35 may not be able to spray water through an angle under about 20°. Thus, although the spray head 35 is adjustable to provide substantially full-circle spray, this does not imply that there is no minimum spray angle.

Figure 4:
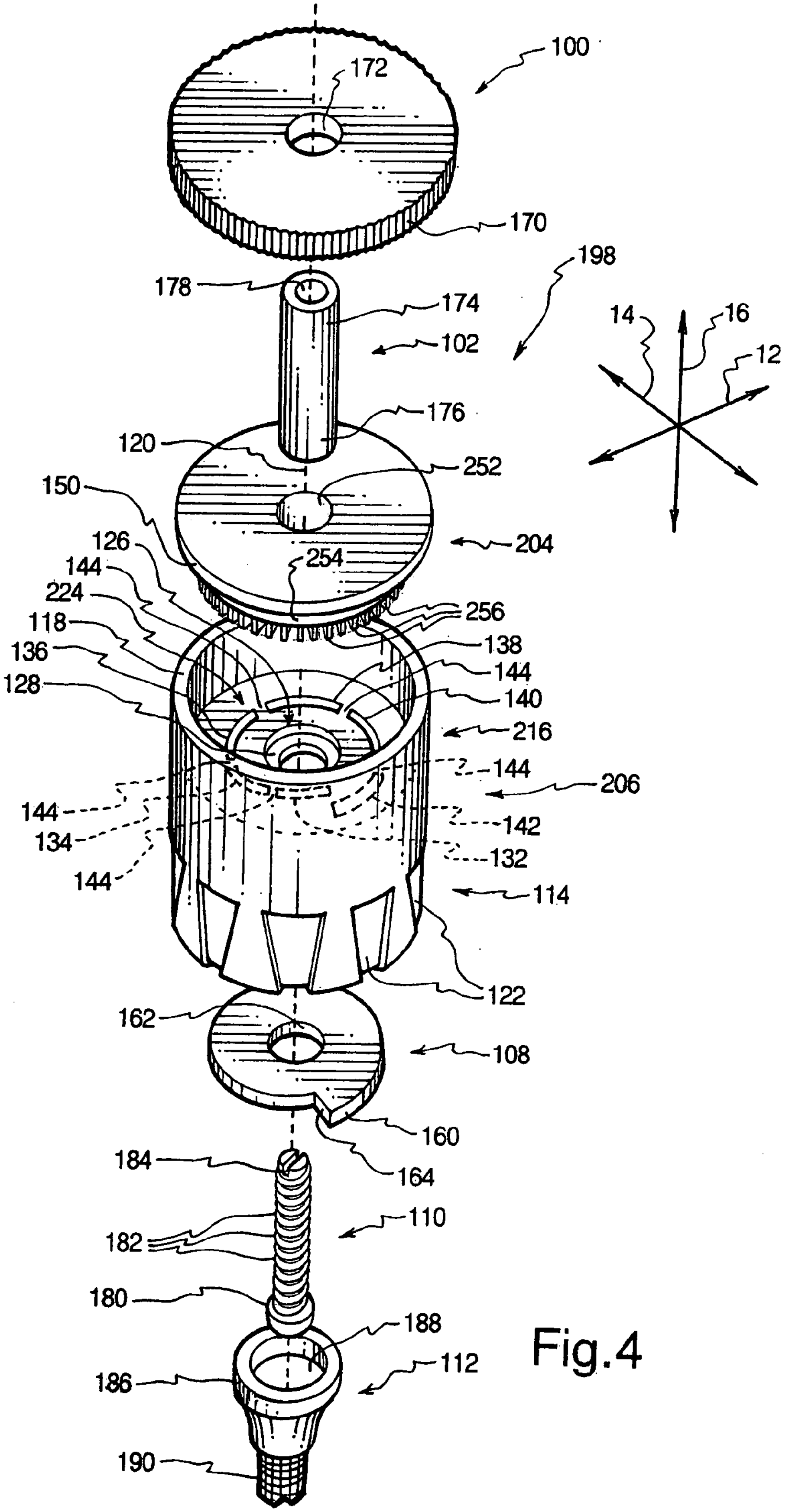
FIG. 4 is an exploded, perspective view of a spray head of a sprinkler according to one alternative embodiment of the invention.

Referring to FIG. 4, an exploded, perspective view illustrates a spray head 198 according to one alternative embodiment of the invention. The spray head 198 has an adjustment dial 100, a shaft 102, a cam 108, and an adjustment screw 110 that may be substantially identical to those of the previous embodiment. The spray head 198 may be used in conjunction with a filter 112, like that illustrated in FIG. 2. Additionally, the spray head 198 has a deflector 204 and a housing 206, which may be different from those of the previous embodiment in a number of respects.

More precisely, the housing 206 may have an inlet portion 114 like that of the previous embodiment, and an outlet portion 216. The housing 206 has an outer wall 118 with a tubular shape coaxial with a cam axis 120. The outer wall 118 transcends the inlet and outlet portions 114, 216, with indentations 122 to facilitate manual threaded assembly. A plate 224 spans the outer wall 118 within the outlet portion 216. The plate has a central hole 126 with a lip 128 like that of the previous embodiment. The plate 224 also has first, second, third, fourth, fifth, and sixth outlet apertures 132, 134, 136, 138, 140, 142 that are separated by bridges 144 like those of the previous embodiment. However, in the spray head 198, no receiving hole 130 need be formed in the plate 224.

The deflector 204 has a lip 150 like that of the previous embodiment and a central hole 252 extending along the cam axis 120. The central hole 252 may be slightly larger in diameter than the central hole 152 of the deflector 108 of the previous embodiment to facilitate rotation of the deflector 204 around the shaft 102. The deflector 204 also has a conical portion 254 that is truncated along a plane perpendicular to the cam axis 120. A plurality of vanes 256 is formed in the resulting circular surface. The vanes 256 operate to induce rotation of the deflector 204 in response to impingement of water exiting the housing 206 against the deflector 204. The vanes 256 will be illustrated with greater detail in FIG. 5.

Figure 5:
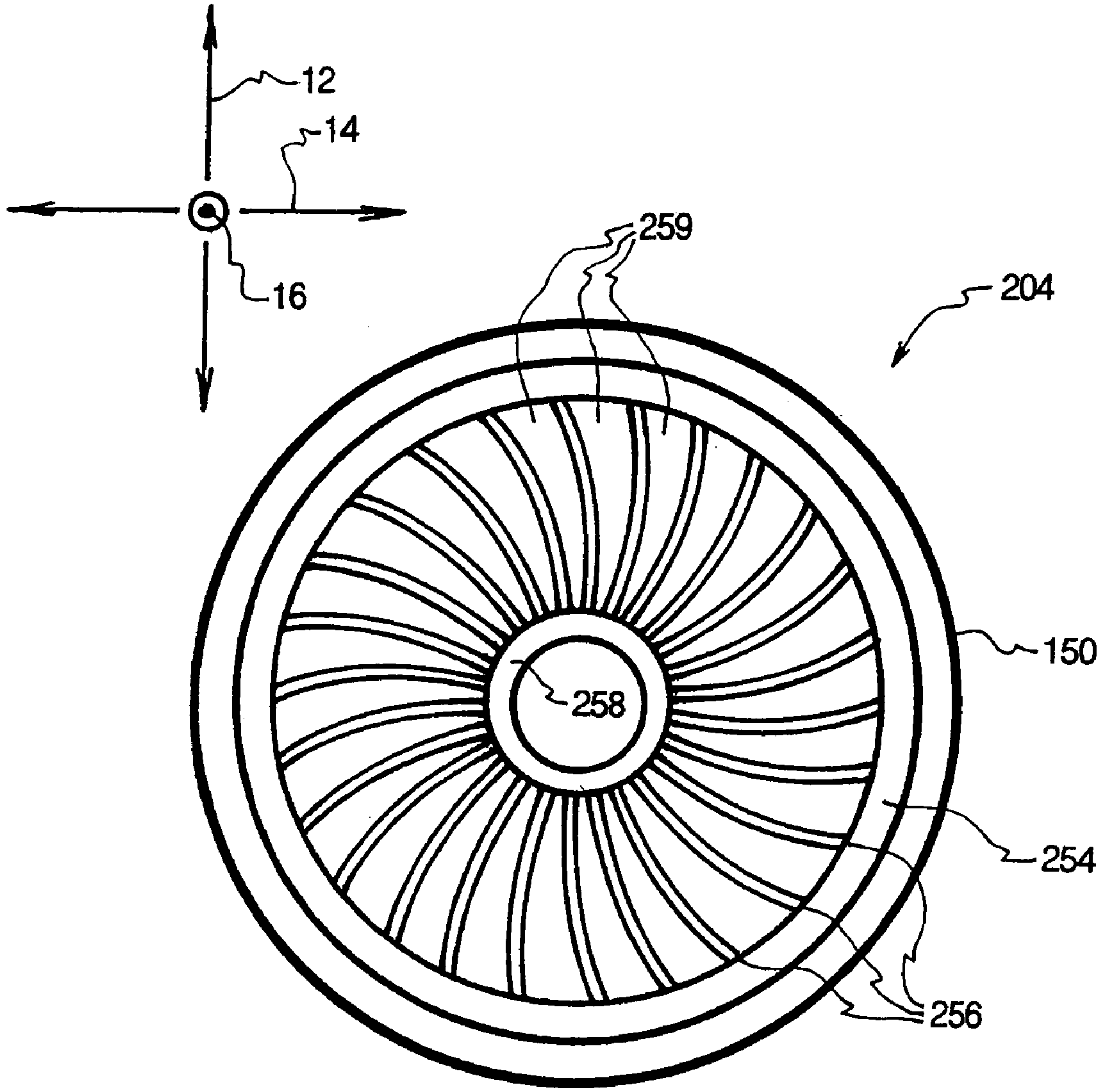
FIG. 5 is bottom view of the deflector of the spray head of FIG. 4.

Referring to FIG. 5, a bottom view illustrates the deflector 204 of FIG. 4 in isolation. As shown, the vanes 256 extend outward with a counterclockwise curvature, with reference to the bottom view of FIG. 5. The deflector 204 also has a hub 258, which may have a generally annular configuration similar to that of the previous embodiment. The hub 258 is insertable into the central hole 126 of the plate 224 in such a manner that the hub 258 rests on the lip 128. The hub 258 may have an outside diameter selected such that the hub 258 is relatively freely rotatable within the central hole 126.

As shown, the vanes 256 are separated from each other by grooves 259 that extend outward from the hub 258 with a counterclockwise curvature like that of the vanes 256. The water impinges against the vanes 258 and flows into the grooves 259. The water then flows outward along the grooves 259. As the water flows along the grooves 259, the water presses against the sides of the vanes 256 to induce rotation of the deflector 204 along the clockwise direction with respect to the view of FIG. 5, or along the counterclockwise direction as viewed from above. Accordingly, the water leaves the deflector 204 with velocity including a tangential component as well as a radial component. The water may thus be more uniformly distributed to the surrounding soil, and the spray head 198 may produce a swirling pattern that is comparatively attractive in operation.

Referring again to FIG. 4, the spray head 198 provides a variable spray arc in a manner similar to that of the previous embodiment. More precisely, the orientation of the cam 108 with respect to the outlet apertures 132, 134, 136, 138, 140, 142 determines the angle through which water is sprayed from the spray head 198. Accordingly, a user may establish the spray pattern and the flow rate of water distributed by the spray head 198 by rotating the adjustment dial 100 and the adjustment screw 110, as described in connection with the previous embodiment.

The various components of the spray head 198 may be manufactured in a manner similar to that of the previous embodiment. As above, operations such as stamping, injection molding, and the like may be used.

Furthermore, the spray head 198 is assembled in a manner similar to that of the spray head 35 of the previous embodiment. The deflector 204 may first be inserted into engagement with the housing 206 by inserting the hub 258 into the central hole 126 of the plate 224 of the housing 206 in such a manner that the hub 258 is able to rotate within the central hole 126 to permit relative rotation between the deflector 204 and the housing 206. The adjustment dial 100 and the cam 108 are press fit onto the first and second ends 174, 176, respectively, of the shaft 102 in such a manner that the shaft 102 extends through the central holes 124, 252 of the housing 206 and the deflector 204. The adjustment screw 110 is threaded into engagement with the bore 178 of the shaft 102.

In other embodiments, spray heads according to the invention may be used to irrigate in patterns that are not bounded by circular shapes. For example, spray heads according to the present invention may be used to irrigate narrow strips of land, such as the strip commonly positioned between a sidewalk and a street. A strip head according to one exemplary embodiment of the invention will be shown and described in connection with FIGS. 6 and 7.

Figure 6:
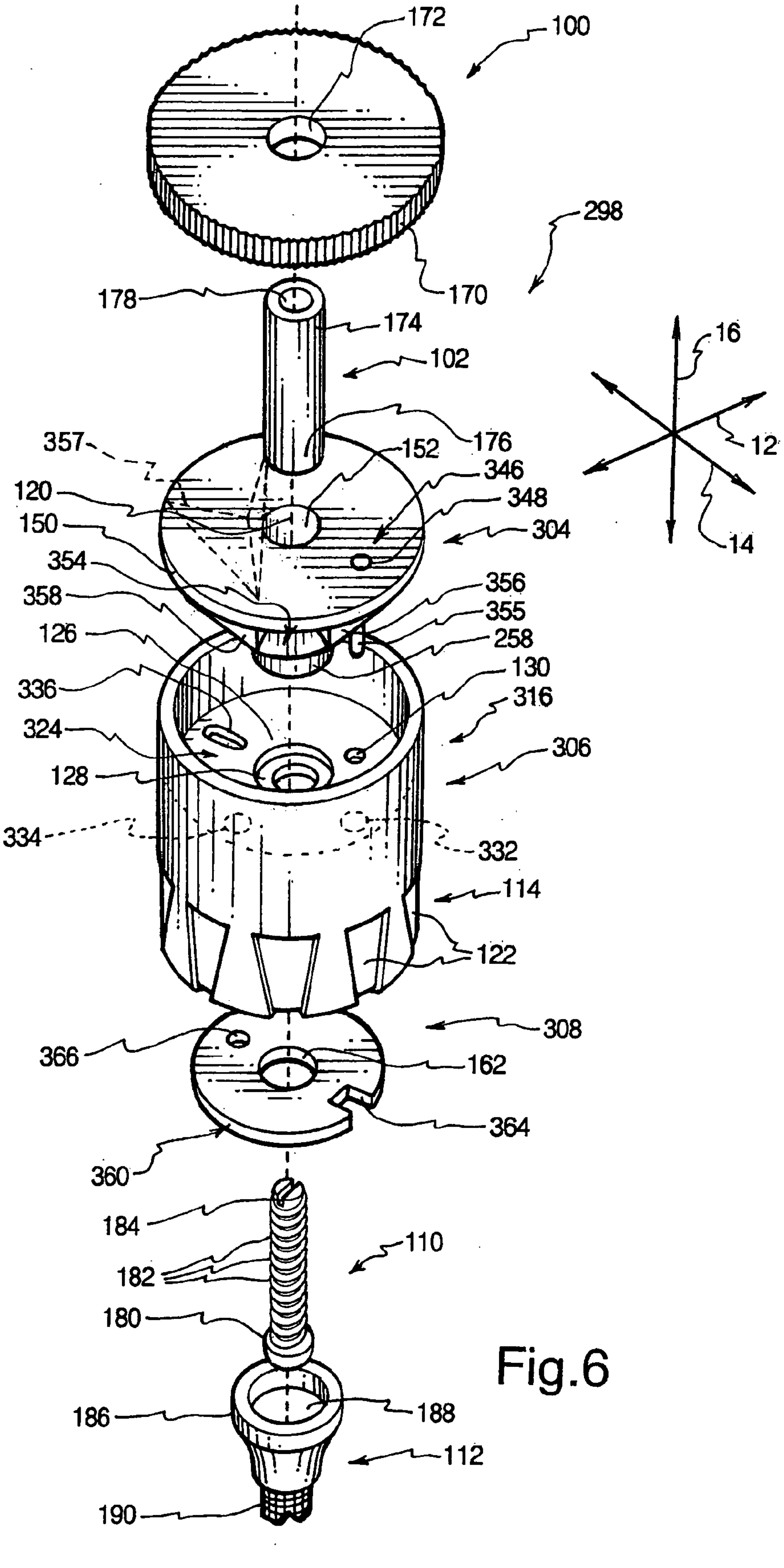
FIG. 6 is an exploded, perspective view of a spray head of a sprinkler according to one alternative embodiment of the invention.

Referring to FIG. 6, an exploded, perspective view illustrates a spray head 298 according to another alternative embodiment of the invention. The spray head 298 is designed to distribute water over an area bounded by a narrow rectangular shape, such as a strip as described above. As shown, the spray head 298 includes an adjustment dial 100, a shaft 102, and an adjustment screw 110. The spray head 198 may be used in conjunction with a filter 112, like that illustrated in FIGS. 2 and 4. The spray head 298 also has a deflector 304, a housing 306, and a cam 308 that are somewhat different from those described previously.

As shown, the housing 306 has an inlet portion 114 like those described previously and an outlet portion 316. The housing 306 has an outer wall 118 with a tubular shape coaxial with a cam axis 120. The outer wall 118 transcends the inlet and outlet portions 114, 316 and has indentations 122 to facilitate manual rotation for threaded engagement. The outlet portion 316 has a plate 324 that extends across the outer wall 118, substantially perpendicular to a cam axis 120.

The plate 324 has a central hole 126 with a lip 128 like those of the previous embodiments. The plate 324 also has a receiving hole 130 like that of the plate 124 of the spray head 35 of the first embodiment. Additionally the plate 324 has a first outlet aperture 332, a second outlet aperture 334, and a third outlet aperture 336 that are arranged around the central hole 126. Each of the first and second outlet apertures 332, 334 may comprise a generally circular shape disposed near the outer wall 118. The third outlet aperture 336 may comprise an elongated slot that extends radially. Thus, one end of the third outlet aperture 336 is disposed near the outer wall 118, like the first and second outlet apertures 332, 334, and the other end of the third outlet aperture 336 is disposed near the central hole 126.

As shown, the deflector 304 has a lip 150 like those of the previous embodiments. The deflector 304 also has a central hole 152 like that of the deflector 104 of the first embodiment. A detent mechanism 346 extends from the deflector 304 toward the adjustment dial 100. The detent mechanism 346 has a ball 348 seated within a hole formed in the deflector 304. The ball 348 is urged away from the deflector 304 by a spring disposed within the hole. The adjustment dial 100 has corresponding divots or ridges that are engaged by the ball 348. The engagement of the ball 348 with the adjustment dial 100 tends to keep the adjustment dial 100 in one of a number of discrete positions with respect to the deflector 304. These relative positions correspond to different spray patterns that the spray head 298 may be set to provide via rotation of the adjustment dial 100 to a corresponding orientation.

Detent mechanisms like the detent mechanism 346 may be used in conjunction with the first embodiment, if desired. For example, such a detent mechanism may be used to cause the spray head 35 to "snap" between commonly used angles such as 30°, 45°, 60°, 90°, 180°, 270°, and 360°.

Returning to the embodiment of FIG. 6, the deflector 304 also has a conical portion 354 that extends from the lip 150 toward the housing 306. An orientation post 355 and a hub 258 like that of the previous embodiment extend toward the housing 306 from the conical portion 354. The orientation post 355 may be inserted into the receiving hole 130 and the hub 258 may be inserted into the central hole 126 of the plate 324 in such a manner that the deflector 304 is unable to rotate with respect to the housing 306.

The conical portion 354 may be uniquely shaped to distribute water along multiple patterns. For example, the conical portion 354 may have a first water distribution feature 356, a second water distribution feature 357, and a third water distribution feature 358. The first water distribution feature 356 and the third water distribution feature 358 may be disposed on opposite sides of the conical portion 354, and the second water distribution feature 357 may be displaced from each of the first and third water distribution features 356, 358 by 90°, for example.

As shown, each of the first, second, and third water distribution features 356, 357, 358 takes the form of a trough formed in the surface of the conical portion 354. The first, second, and third water distribution features 356, 357, 358 may each be shaped to spray water along a substantially consistent pattern. A "water distribution feature" is a feature capable of receiving a water flow and ejecting the water through the air along a desired pattern. In alternative embodiments of the invention, water distribution features may comprise enclosed passageways, elements that protrude into the water stream to control the flow, shaped apertures, and/or other known fluid conduction and control features.

The first and third water distribution features 356, 358 may each be designed to provide end strip irrigation so that the first and third water distribution features 356, 358 may be used together to provide center strip irrigation. The second water distribution feature 357 may be designed to provide side strip irrigation.

Accordingly, the first, second, and third water distribution features 356, 357, 358 are aligned with the first, second, and third outlet apertures 332, 334, 336, respectively, along the transverse direction 16. These types of irrigation provided by the first, second, and third water distribution features 356, 357, 358 will be shown and described in greater detail in connection with FIGS. 7B, 7D, and 7F.

The cam 308 has an outer edge 360 with a generally circular shape. The cam 308 also has a central hole 162 like those of the previous embodiments. A notch 364 is formed in the outer edge 360. Additionally, a hole 366 is formed in the cam 308, on the side of the cam 308 opposite from the notch 364. The hole 366 is positioned with a displacement from the central hole 162 smaller than the displacement of the notch 364 from the central hole 162. The notch 364 and the hole 366 provide open portions of the cam 308, through which water is able to flow beyond the cam 308.

The adjustment dial 100, shaft 102, deflector 304, housing 306, cam 308, and adjustment screw 110 may be formed via methods similar to those described above, in connection with the spray head 35. For example, the adjustment dial 100 and the cam 308 may be stamped from relatively thin strips of metal, the shaft 102 may be cut from a length of threaded tubular stock, and the deflector 304 and housing 306 may be injection molded. The adjustment screw 110 may be formed via known methods such as casting.

The adjustment dial 100, shaft 102, deflector 304, housing 306, cam 308, and adjustment screw 110 may be assembled in a manner similar to that of the previous embodiments. More precisely, the deflector 304 and the housing 306 may first be aligned and moved together in such a manner that the orientation post 355 is inserted into the receiving hole 130 and the hub 258 is inserted into the central hole 126 of the plate 324. The orientation post 355 and the hub 258 may be attached within the receiving hole 130 and the central hole 126, respectively, via press fitting, adhesive bonding, or the like to prevent disassembly or relative rotation of the deflector 304 and the housing 306.

The adjustment dial 100 and the cam 308 may then be pressed into engagement with the shaft 102 in such a manner that the first end 174 of the shaft 102 is press fit into the central hole 172 of the adjustment dial 100 and the second end 176 of the shaft 102 is press fit into the central hole of the central hole 162 of the cam 308. The shaft 102 then extends through the central holes 126, 152 of the plate 324 and the deflector 304 so that the adjustment dial 100 is disposed adjacent to the deflector 304 and the cam 308 is disposed adjacent to the plate 324. The adjustment screw 110 may then be threaded into the bore 178 of the shaft 102 in such a manner that the head 180 protrudes from the bore 178 proximate the second end 176 of the shaft 102 and the slot 184 is accessible through the first end 174.

The spray head 298 is then fully assembled. The filter 112 and the spray head 298 may then be attached to the corresponding pop-up stem 34 in the manner described above, in connection with the spray head 35 of FIGS. 1–3.

In operation, water flows into the spray head 298 through the filter 112. Adjustment of the flow rate of water entering the spray head 298 is provided by altering the position of the head 108 of the adjustment screw 110 relative to the tapered bore 188 of the filter 112, as described above. The water flows against the cam 308, and flows through any of the outlet apertures 332, 334, 336 that are exposed through the notch 364 or the hole 366 of the cam 308. The orientation of the cam 308 with respect to the plate 324 determines which of the outlet apertures 332, 334, 336 are exposed to receive water flow.

After moving through the exposed outlet aperture(s) 332, 334, and/or 336, the water impinges against the corresponding one or more of the first, second, and third water distribution features 356, 357, 358. The water is distributed by the corresponding one or more of the water distribution features 356, 357, 358 along a pattern corresponding to the shape of the water distribution feature(s) 356, 357, and/or 358 that receive the water. The manner in which water is distributed will be shown and described with greater detail in connection with FIGS. 7A–7F, as follows.

Figures 7A, 7B, 7C, 7D:
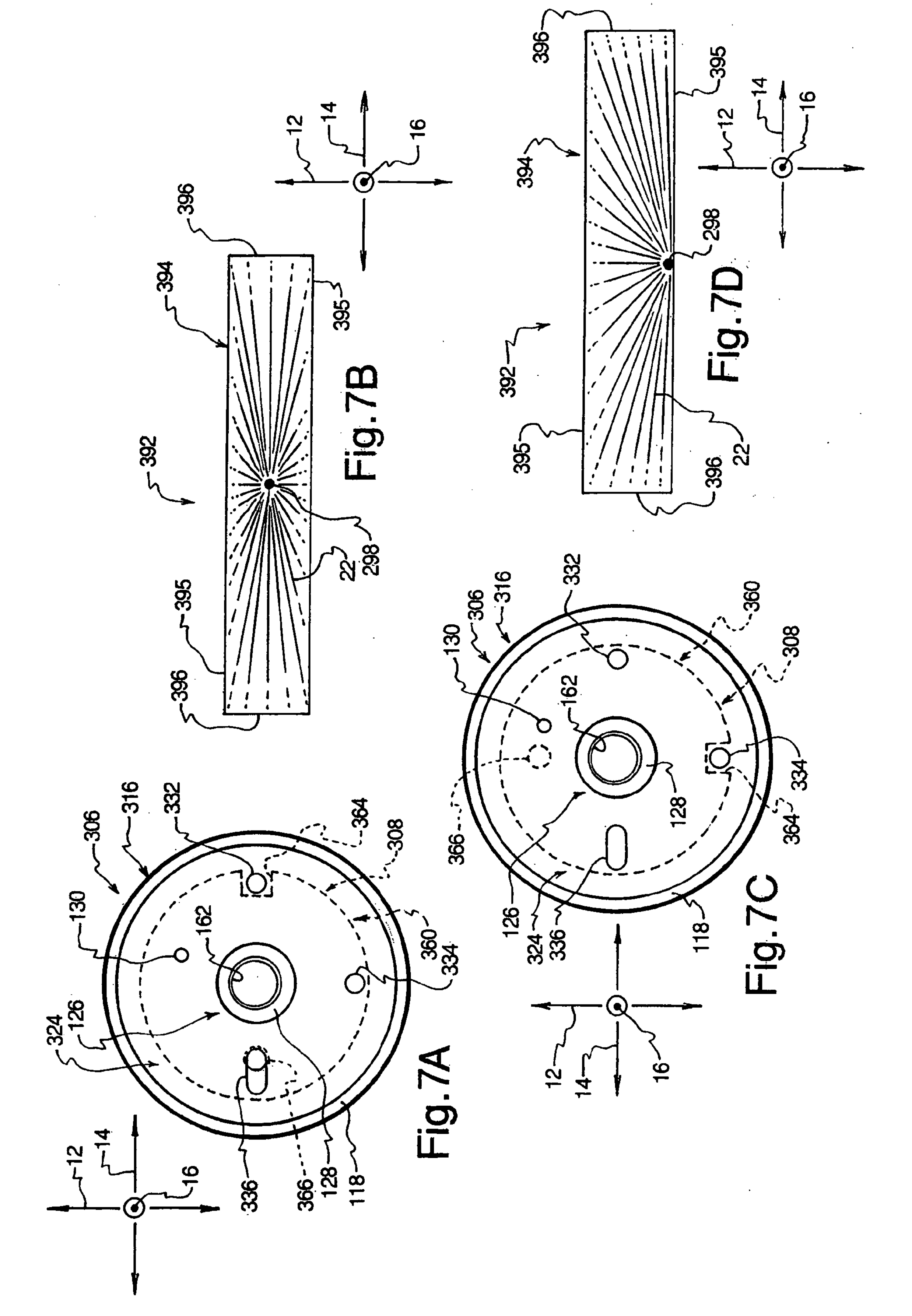
FIG. 7A is a plan view of the housing and the cam of the spray head of FIG. 6, with the housing and cam (shown in phantom lines) relatively positioned for center strip irrigation.
FIG. 7B is a plan view of a strip area in which the spray head of FIG. 6 is installed to provide center strip irrigation.
FIG. 7C is a plan view of the housing and the cam of the spray head of FIG. 6, with the housing and cam (shown in phantom lines) relatively positioned for side strip irrigation.
FIG. 7D is a plan view of a strip area in which the spray head of FIG. 6 is installed to provide side strip irrigation.

Referring to FIG. 7A, a plan view illustrates the housing 306 and the cam 308 (shown in phantom lines) of the spray head 298 of FIG. 6. The cam 308 is shown oriented for center strip irrigation. More precisely, the cam 308 is oriented such that the notch 364 is aligned with the first outlet aperture 332 and the hole 366 is aligned with an inwardly disposed portion of the third outlet aperture 336. Accordingly, water flows through the first and third outlet apertures 332, 336 to impinge against the first and third water distribution features 356, 358, respectively. The first and third water distribution features 356, 358 cooperate to provide water flow from the spray head 298 through 360° for center strip irrigation.

Referring to FIG. 7B, a plan view illustrates a strip area 392 in which the spray head 298 of FIG. 6 is installed, with the cam 308 and housing 306 relatively positioned as shown in FIG. 7A. The strip area 392 may be a section of a strip disposed between a sidewalk and a street, and may thus have a rectangular shape 394 having two long sides 395 and two short sides 396. The long sides 395 may each be from about twenty to about forty feet in length, and the short sides may each be from about two to about five feet in length.

The spray head 298 is installed in the center of the strip area 392. The first water distribution feature 356 faces toward one of the short sides 396, and the third water distribution feature 358 faces in the opposite direction, toward the opposite short side 396. Each of the first and third water distribution features 356, 358 distributes water over about a 180° arc along a generally rectangular pattern so that each of the first and third water distribution features 356, 358 irrigates half of the strip area 392. Accordingly, the first and third water distribution features 356, 358 cooperate to irrigate substantially the entire strip area 392. Thus, the spray head 298 provides a rectangular spray pattern, or spray that is generally limited to the area within a narrow rectangle. A "spray pattern" is the shape of the area irrigated by a sprinkler head, as viewed from overhead.

Referring to FIG. 7C, a plan view illustrates the housing 306 and the cam 308 of the spray head 298 of FIG. 6. The cam 308 is shown oriented for side strip irrigation. More precisely, the cam 308 is oriented such that the notch 364 is aligned with the second outlet aperture 334 and the hole 366 is not aligned with any of the outlet apertures 332, 334, 336. Accordingly, water flows through the second outlet apertures 334 to impinge against the second water distribution features 357. The second water distribution feature 357 provides water flow from the spray head 298 through 180° for side strip irrigation.

Referring to FIG. 7D, a plan view illustrates a strip area 392 in which the spray head 298 of FIG. 6 is installed, with the cam 308 and housing 306 relatively positioned as shown in FIG. 7C. As in FIG. 7B, the strip area 392 may be a section of a strip disposed between a sidewalk and a street, with a rectangular shape 394 having two long sides 395 and two short sides 396.

The spray head 298 is installed on a side of the strip area 392, proximate the center of one of the long sides 395 of the rectangular shape 394. The second water distribution feature 357 faces toward the center of the strip area 392. The second water distribution feature 357 distributes water over about a 180° arc along a generally rectangular pattern so that the second water distribution feature 357 irrigates substantially the entire strip area 392.

Figure 7F:
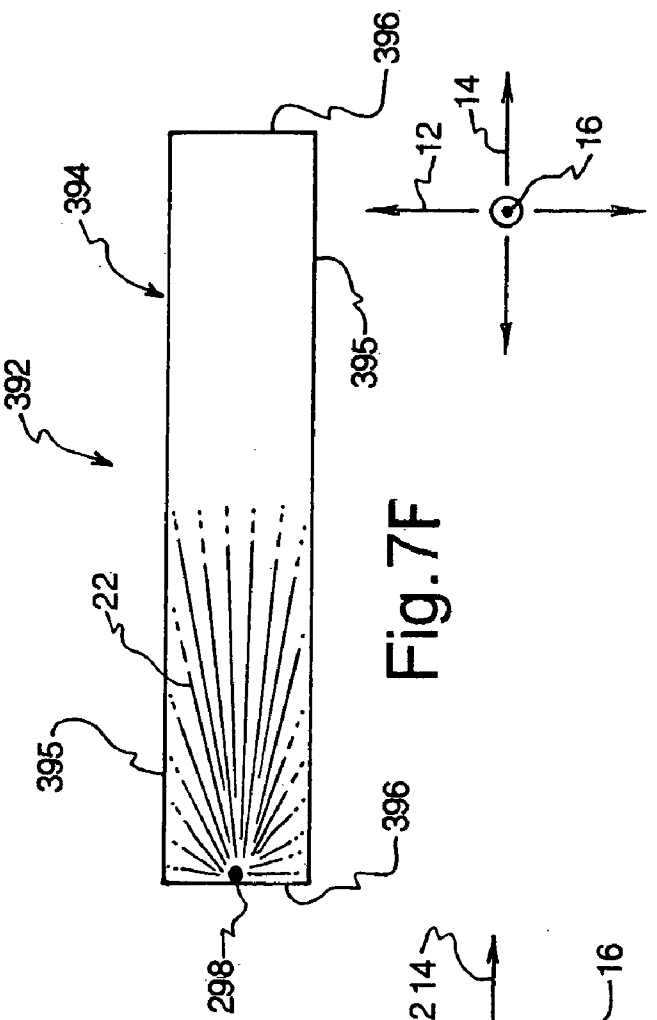
FIG. 7F is a plan view of a strip area in which the spray head of FIG. 6 is installed to provide end strip irrigation.
Figure 7E:
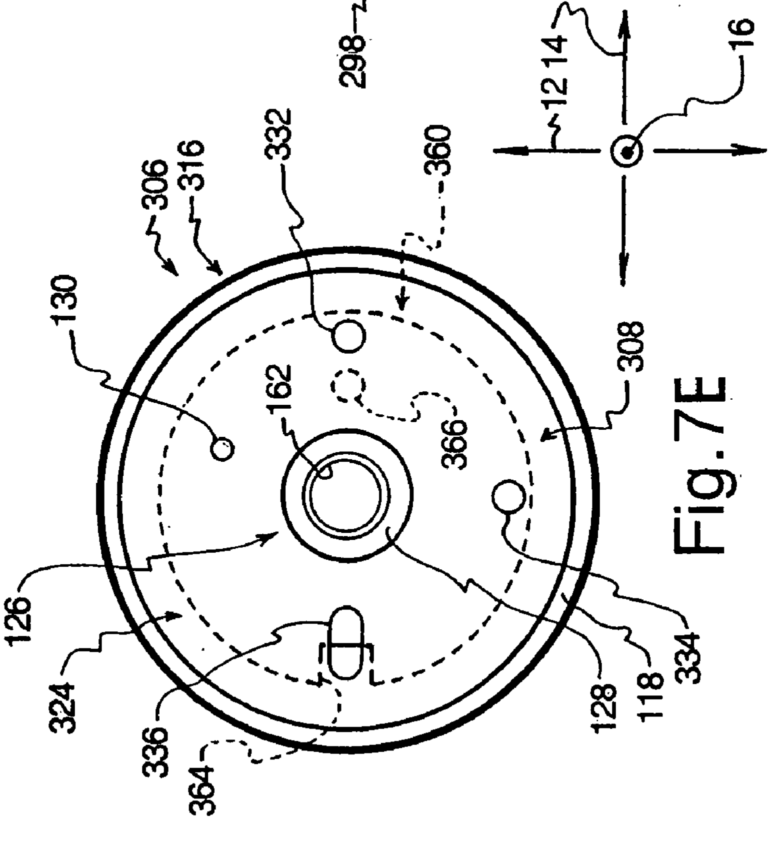
FIG. 7E is a plan view of the housing and the cam of the spray head of FIG. 6, with the housing and cam (shown in phantom lines) relatively positioned for side strip irrigation.

Referring to FIG. 7E, a plan view illustrates the housing 306 and the cam 308 (shown in phantom lines) of the spray head 298 of FIG. 6. The cam 308 is shown oriented for end strip irrigation. More precisely, the cam 308 is oriented such that the notch 364 is aligned with the outward portion of the third outlet aperture 336 and the hole 366 is not aligned with any of the outlet apertures 332, 334, 336. Accordingly, water flows through the third outlet aperture 336 to impinge against the third water distribution features 358. The third water distribution feature 358 provides water flow from the spray head 298 through 180° for end strip irrigation.

Referring to FIG. 7F, a plan view illustrates a strip area 392 in which the spray head 298 of FIG. 6 is installed, with the cam 308 and housing 306 relatively positioned as shown in FIG. 7E. As in FIG. 7B, the strip area 392 may be a section of a strip disposed between a sidewalk and a street, with a rectangular shape 394 having two long sides 395 and two short sides 396.

The spray head 298 is installed on a side of the strip area 392, proximate the center of one of the short sides 396 of the rectangular shape 394. The third water distribution feature 358 faces toward the center of the strip area 392. The third water distribution feature 357 distributes water over about a 180° arc along a generally rectangular pattern so that the second water distribution feature 357 irrigates about half of the strip area 392.

According to alternative configurations, other watering patterns may be used in place of or in addition to those provided by the spray head 298. For example, quarter-circle, half-circle, and/or full-circle spray patterns may be used. Additional outlet apertures (not shown) may be used in conjunction with additional holes and/or notches in a cam to provide a wider array of spray patterns.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An irrigation system for distributing water to soil, the irrigation system comprising:

a valve coupled to a source of water, the valve having an open position in which water flows through the valve;

a conduit coupled to the valve to receive the water from the valve; and a sprinkler having an adjustable spray pattern, the sprinkler comprising a housing and a cam, the housing comprising an inlet portion coupled to the conduit to receive the water from the conduit, and an outlet portion comprising a first outlet aperture, wherein the cam is disposed adjacent to the first outlet aperture to control water flow through the first outlet aperture such that water flows beyond a group consisting of the first outlet aperture and the cam along a direction substantially parallel to a cam axis about which the cam is rotatable in-plane, wherein the cam is rotatable to a position in which the sprinkler sprays water about one or more angles totaling more than 270 degrees.

2. The irrigation system of claim 1, wherein the valve is electrically controllable to move the valve between the open position and a closed position in which the valve substantially blocks water flow to the conduit.

3. The irrigation system of claim 1, further comprising a plurality of additional sprinklers and conduits coupled to the valve to receive water from the valve.

4. The irrigation system of claim 3, further comprising a plurality of additional valves, corresponding conduits, and corresponding sprinklers.

5. The irrigation system of claim 4, further comprising at least one timer coupled to the valves to control operation of the valves.

6. The irrigation system of claim 1, wherein the housing comprises a substantially cylindrical shape coaxial with the cam axis, the sprinkler further comprising a casing and a pop-up stem slidably attached to the casing, wherein the housing is attached to the pop-up stem such that the sprinkler operates as a pop-up type sprinkler.

7. The irrigation system of claim 1, wherein the outlet portion comprises a substantially flat wall disposed generally perpendicular to the cam axis, wherein the first outlet aperture is formed in the substantially flat wall.

8. The irrigation system of claim 1, wherein the adjustable spray pattern comprises an arc that is continuously variable through an arc angle, wherein the first outlet aperture extends through the arc angle with respect to the cam axis and has a gradually increasing radius within the arc angle, and wherein the cam comprises an outer edge having a gradually increasing radius within the arc angle.

9. The irrigation system of claim 8, wherein the sprinkler further comprises a deflector positioned such that water exiting the outlet portion through the first outlet aperture is deflected to provide the spray pattern.

10. The irrigation system of claim 1, wherein the outlet portion further comprises a second outlet aperture, wherein the first outlet aperture is in fluid communication with a first water distribution feature and the second outlet aperture is in fluid communication with a second water distribution feature, wherein the cam comprises an open portion alignable with either of the first and second outlet apertures to permit water to flow to either of the first and second water distribution features.

11. A sprinkler having an adjustable spray pattern, the sprinkler comprising:

a housing comprising an inlet portion disposed to receive water and an outlet portion comprising a first outlet aperture; and a cam disposed adjacent to the first outlet aperture to control water flow through the first outlet aperture such that water flows beyond a group consisting of the first outlet aperture and the cam along a direction substantially parallel to a cam axis about which the cam is rotatable in-plane;

wherein the cam is rotatable to a position in which the sprinkler sprays water about one or more angles totaling more than 270 degrees.

12. The sprinkler of claim 11, wherein the housing comprises a substantially cylindrical shape coaxial with the cam axis.

13. The sprinkler of claim 12, further comprising a casing and a pop-up stem, wherein the housing is attached to the pop-up stem such that the sprinkler operates as a pop-up type sprinkler.

14. The sprinkler of claim 11, wherein the outlet portion comprises a substantially flat wall disposed generally perpendicular to the cam axis, wherein the first outlet aperture is formed in the substantially flat wall.

15. The sprinkler of claim 11, wherein the cam is disposed upstream of the first outlet aperture to adjustably impede passage of water into the first outlet aperture.

16. The sprinkler of claim 11, wherein the adjustable spray pattern comprises an arc that is continuously variable through an arc angle, wherein the first outlet aperture extends through the arc angle with respect to the cam axis and has a gradually increasing radius within the arc angle.

17. The sprinkler of claim 16, further comprising a deflector fixedly disposed with respect to the housing and positioned such that water exiting the outlet portion through the first outlet aperture is deflected to provide the spray pattern.

18. The sprinkler of claim 16, further comprising a deflector rotatable with respect to the housing and positioned such that water exiting the outlet portion through the first outlet aperture is deflected to provide the spray pattern.

19. The sprinkler of claim 16, wherein the arc includes a spray pattern in which water is sprayed substantially full-circle from the sprinkler.

20. The sprinkler of claim 16, wherein the cam comprises an outer edge having a gradually increasing radius within the arc angle.

21. The sprinkler of claim 11, wherein the outlet portion further comprises a second outlet aperture, wherein the first outlet aperture is in fluid communication with a first water distribution feature and the second outlet aperture is in fluid communication with a second water distribution feature, wherein the cam comprises an open portion alignable with either of the first and second outlet apertures to permit water to flow to either of the first and second water distribution features.

22. The sprinkler of claim 21, wherein at least one of the first and second water distribution features is shaped to distribute water within a shape bounded by a narrow rectangle to facilitate operation of the sprinkler as a strip sprinkler.

23. The sprinkler of claim 11, further comprising an adjustment dial separately formed from the cam and coupled to the cam to transmit torque manually applied to the adjustment dial by a user to the cam to induce rotation of the cam.

24. A sprinkler having an adjustable spray pattern, the sprinkler comprising:

a housing comprising an inlet portion disposed to receive water and an outlet portion comprising a substantially flat wall in which a first outlet aperture is formed; and a cam disposed adjacent to the substantially flat wall, wherein the cam is rotatable about a cam axis perpendicular to the substantially flat wall to control water flow through the first outlet aperture;

wherein the cam is rotatable to a position in which the sprinkler sprays water about one or more angles totaling more than 270 degrees.

25. The sprinkler of claim 24, wherein the housing comprises a substantially cylindrical shape coaxial with the cam axis.

26. The sprinkler of claim 24, wherein the adjustable spray pattern comprises an arc that is continuously variable through an arc angle, wherein the first outlet aperture extends through the arc angle with respect to the cam axis and has a gradually increasing radius within the arc angle, wherein the cam comprises an outer edge having a gradually increasing radius within the arc angle.

27. The sprinkler of claim 26, wherein the arc includes a spray pattern in which water is sprayed substantially full-circle from the sprinkler.

28. The sprinkler of claim 24, wherein the outlet portion further comprises a second outlet aperture formed in the substantially flat wall, wherein the first outlet aperture is in fluid communication with a first water distribution feature and the second outlet aperture is in fluid communication with a second water distribution feature, wherein the cam comprises an open portion alignable with either of the first and second outlet apertures to permit water to flow to either of the first and second water distribution features.

29. The sprinkler of claim 24, wherein the cam is disposed upstream of the first outlet aperture so that the cam can block a pathway of water into a variable portion of the first outlet aperture.

30. The sprinkler of claim 29, further comprising a deflector disposed downstream of the substantially flat wall to deflect water exiting the outlet away from the cam axis.

31. A sprinkler having an adjustable spray pattern, the sprinkler comprising:

a housing comprising an inlet portion disposed to receive water and an outlet portion comprising a first outlet aperture disposed along a gradually increasing radius extending through an arc angle with respect to a cam axis; and a cam disposed adjacent to the first outlet aperture, wherein the cam is rotatable in-plane about the cam axis to adjust the spray pattern of water that exits the outlet portion through the first outlet aperture.

32. The sprinkler of claim 31, wherein the cam comprises an outer edge having a gradually increasing radius within the arc angle.

33. The sprinkler of claim 31, wherein the arc angle includes a spray pattern in which water is sprayed substantially full-circle from the sprinkler.

34. The sprinkler of claim 33, wherein the outlet portion further comprises a plurality of additional outlet apertures arranged in a spiral pattern with the first outlet aperture.

35. The sprinkler of claim 31, wherein the cam is disposed upstream of the first outlet aperture to adjustably impede passage of water into the first outlet aperture.

36. The sprinkler of claim 31, wherein the first outlet aperture comprises an elongated slot.

37. The sprinkler of claim 31, further comprising a deflector positioned such that water exiting the outlet portion through the first outlet aperture is deflected to provide the spray pattern.

38. A sprinkler having an adjustable spray pattern, the sprinkler comprising:

a housing comprising an inlet portion disposed to receive water and an outlet portion comprising a first outlet aperture;

a cam disposed adjacent to the first outlet aperture to control water flow through the first outlet aperture such that water flows beyond the group consisting of the first outlet aperture and the cam along a direction substantially parallel to a cam axis about which the cam is rotatable in-plane; and a deflector fixedly disposed with respect to the housing and positioned such that water exiting the outlet portion through the first outlet aperture is deflected to provide the spray pattern.

39. The sprinkler of claim 38, wherein the outlet portion comprises a substantially flat wall disposed generally perpendicular to the cam axis, wherein the first outlet aperture is formed in the substantially flat wall.

40. The sprinkler of claim 38, wherein the adjustable spray pattern comprises an arc that is continuously variable through an arc angle, wherein the first outlet aperture extends through the arc angle with respect to the cam axis and has a gradually increasing radius within the arc angle, wherein the cam comprises an outer edge having a gradually increasing radius within the arc angle.

41. The sprinkler of claim 40, wherein the arc includes a spray pattern in which water is sprayed substantially full-circle from the sprinkler.

42. The sprinkler of claim 38, further comprising an adjustment dial separately formed from the cam and coupled to the cam to transmit torque manually applied to the adjustment dial by a user to the cam to induce rotation of the cam.

43. The sprinkler of claim 42, wherein the deflector is disposed between the adjustment dial and the cam, the sprinkler further comprising a shaft extending through the deflector, from the adjustment dial to the cam to convey torque from the adjustment dial to the cam.

44. The sprinkler of claim 43, wherein the shaft is formed separately from the adjustment dial and the cam.

45. The sprinkler of claim 38, wherein the deflector has a generally conical shape.

46. The sprinkler of claim 45, wherein the deflector comprises a skirt that extends along a portion of the cam axis to block water flow toward the cam axis downstream of the first outlet aperture.

47. A method for distributing water to soil through the use of a sprinkler comprising a housing and a cam, the housing having an inlet portion and an outlet portion comprising a first outlet aperture, wherein the cam is disposed adjacent to the first outlet aperture, the method comprising:

receiving the water in the inlet portion of the housing;

moving the water through the first outlet aperture in a manner controlled by the cam such that water flows beyond the group consisting of the first outlet aperture and the cam along a direction substantially parallel to a cam axis about which the cam is rotatable; and distributing the water to the soil about one or more angles totaling more than 270 degrees, along a spray pattern defined by motion of the water through the first outlet aperture.

48. The method of claim 47, wherein the housing comprises a substantially cylindrical shape coaxial with the cam axis, the sprinkler further comprising a casing and a pop-up stem to which the housing is attached, the method further comprising sliding the pop-up stem upward with respect to the casing to elevate the housing upward with respect to the casing.

49. The method of claim 47, wherein the first outlet aperture is formed in a substantially flat wall disposed generally perpendicular to the cam axis, wherein moving the water through the first outlet aperture comprises moving the water past the substantially flat wall.

50. The method of claim 47, wherein the cam is disposed upstream of the first outlet aperture to adjustably impede passage of water into the first outlet aperture, the method further comprising moving the water through an open portion of the cam prior to passage of the water through the first outlet aperture.

51. The method of claim 47, wherein the adjustable spray pattern comprises an arc that is continuously variable through an arc angle, wherein the first outlet aperture extends through the arc angle with respect to the cam axis and has a gradually increasing radius within the arc angle, wherein the cam comprises an outer edge having a gradually increasing radius within the arc angle, the method further comprising rotating the cam with respect to the first outlet aperture to determine the arc.

52. The method of claim 51, wherein the sprinkler further comprises a deflector fixedly disposed with respect to the housing, the method further comprising deflecting the water downstream of the first outlet aperture to provide the spray pattern.

53. The method of claim 51, wherein the sprinkler further comprises a deflector rotatable with respect to the housing, the method further comprising deflecting the water downstream of the first outlet aperture to provide the spray pattern.

54. The method of claim 51, wherein distributing the water to the soil comprises spraying the water substantially full-circle from the sprinkler.

55. The method of claim 47, wherein the outlet portion further comprises a second outlet aperture, wherein the first outlet aperture is in fluid communication with a first water distribution feature and the second outlet aperture is in fluid communication with a second water distribution feature, wherein the cam comprises an open portion, the method further comprising rotating the cam to align the open portion with either of the first and second outlet apertures to permit water to flow to either of the first and second water distribution features.

56. The method of claim 55, wherein distributing the water to the soil comprises distributing the water within a shape bounded by a narrow rectangle to facilitate operation of the sprinkler as a strip sprinkler.

57. The method of claim 47, further comprising an adjustment dial separately formed from the cam and coupled to the cam, the method further comprising manually rotating the adjustment dial to induce rotation of the cam, thereby determining the spray pattern.

58. A method for manufacturing a sprinkler having an adjustable spray pattern, the method comprising:

forming a housing comprising an inlet portion disposed to receive water and an outlet portion comprising a substantially flat wall in which a first outlet aperture is formed;

forming a cam; and disposing the cam adjacent to the substantially flat wall such that the cam is rotatable about a cam axis perpendicular to the substantially flat wall to control water flow through the first outlet aperture;

wherein the cam is rotatable to a position in which the sprinkler sprays water about one or more angles totaling more than 270 degrees.

59. The method of claim 58, wherein forming the housing comprises forming a substantially cylindrical shape coaxial with the cam axis.

60. The method of claim 58, wherein the adjustable spray pattern comprises an arc that is continuously variable through an arc angle, wherein forming the housing comprises forming the first outlet aperture with a gradually increasing radius within the arc angle, wherein forming the cam comprises forming an outer edge of the cam, the outer edge having a gradually increasing radius within the arc angle.

61. The method of claim 60, wherein the cam is rotatable to a position in which water is sprayed substantially full-circle from the sprinkler.

62. The method of claim 58, wherein forming the housing comprises forming a second outlet aperture in the substantially flat wall, forming a water distribution feature in fluid communication with the first outlet aperture, and forming a second water distribution feature in fluid communication with the second outlet aperture, wherein forming the cam comprises forming an open portion in the cam, wherein disposing the cam adjacent to the substantially flat wall comprises disposing the open portion to be alignable with either of the first and second outlet apertures to permit water to flow to either of the first and second water distribution features.

63. The method of claim 58, wherein disposing the cam adjacent to the substantially flat wall comprises disposing the cam upstream of the first outlet aperture so that the cam can block a pathway of water into a variable portion of the first outlet aperture.

64. The method of claim 63, further comprising:

forming a deflector; and disposing the deflector downstream of the substantially flat wall to deflect water exiting the outlet away from the cam axis.

* * * * *